US012641027B2

(12) United States Patent
Li et al.

(10) Patent No.: US 12,641,027 B2
(45) Date of Patent: May 26, 2026

(54) COMMUNICATION METHOD, DEVICE, AND SYSTEM

(71) Applicant: Huawei Technologies Co., Ltd., Shenzhen (CN)

(72) Inventors: Yuechen Li, Dongguan (CN); Hao Li, Shenzhen (CN); Bin Xia, Dongguan (CN); Feng Zeng, Boulogne Billancourt (FR); Runfa Zhou, Shenzhen (CN); Xiaoshan Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/515,459

(22) Filed: Nov. 21, 2023

(65) Prior Publication Data

US 2024/0089204 A1 Mar. 14, 2024

Related U.S. Application Data

(63) Continuation of application No. PCT/CN2022/075558, filed on Feb. 8, 2022.

(30) Foreign Application Priority Data

May 21, 2021 (CN) .......................... 202110559103.1

(51) Int. Cl.
*H04L 47/12* (2022.01)
*H04L 45/00* (2022.01)
*H04L 47/11* (2022.01)

(52) U.S. Cl.
CPC .............. *H04L 47/12* (2013.01); *H04L 45/34* (2013.01); *H04L 47/11* (2013.01)

(58) Field of Classification Search
CPC ......... H04L 47/12; H04L 45/34; H04L 45/22; H04L 45/28; H04L 47/11; H04L 47/127
See application file for complete search history.

(56) References Cited

U.S. PATENT DOCUMENTS 9,537,769 B2 * 1/2017 Bryant .................... H04L 45/74
2011/0205898 A1 * 8/2011 Ichiki ...................... H04L 45/00
370/252

FOREIGN PATENT DOCUMENTS

| CN | 107548545 A | 1/2018 |
| CN | 109194577 A | 1/2019 |
| CN | 109922004 A | 6/2019 |
| CN | 110505600 A | 11/2019 |

(Continued)

OTHER PUBLICATIONS

Giorgetti, "Segment Routing for Effective Recovery . . . :", Optical Society of America, 2017 (Year: 2017).*

(Continued)

*Primary Examiner* — Emmanuel L Moise
*Assistant Examiner* — Mariegeorges A Henry
(74) *Attorney, Agent, or Firm* — Conley Rose, P.C.

(57) ABSTRACT

A communication method includes, after determining a node set including a node that supports segment routing, a controller may send a target segment identifier list to a source node, to instruct the source node to forward a packet of a target flow based on the target segment identifier list, where the source node of the target flow in a communication network belongs to the node set. The target segment identifier list may be sent to the source node of the target flow, to indicate a packet forwarding path of the target flow.

20 Claims, 10 Drawing Sheets

(56)          References Cited

FOREIGN PATENT DOCUMENTS

| | | | | | |
|---|---|---|---|---|---|
| CN | 110865544 | A | * | 3/2020 | .............. G06F 8/65 |
| CN | 111684768 | A | | 9/2020 | |
| CN | 111865789 | A | * | 10/2020 | ............. H04L 45/30 |
| CN | 106803812 | B | * | 12/2020 | ........... H04L 45/247 |
| CN | 112039767 | A | * | 12/2020 | ............. H04L 45/08 |
| CN | 112468394 | A | * | 3/2021 | ............. H04L 45/22 |
| EP | 3764609 | B1 | * | 8/2023 | ............. H04L 45/30 |

OTHER PUBLICATIONS

Filsfils, C., et al., "Segment Routing Policy Architecture draft-ietf-spring-segment-routing-policy-01.txt," Spring Working Group, Internet-Draft, Jun. 11, 2018, 33 pages, XP015126822.
Giorgetti, A., et al., "Segment Routing for Effective Recovery and Multi-domain Traffic Engineering," vol. 9, No. 2, Feb. 1, 2017, 10 pages, XP011641460.

* cited by examiner

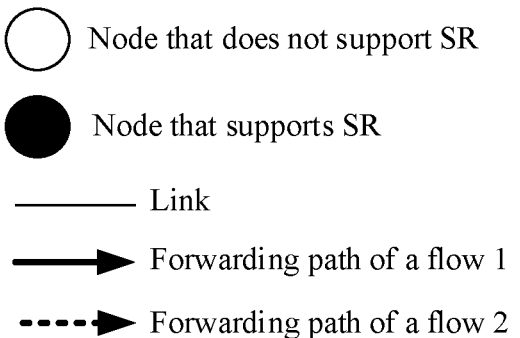
◯   Node that does not support SR
●   Node that supports SR
———   Link
➡   Forwarding path of a flow 1
┅➤   Forwarding path of a flow 2
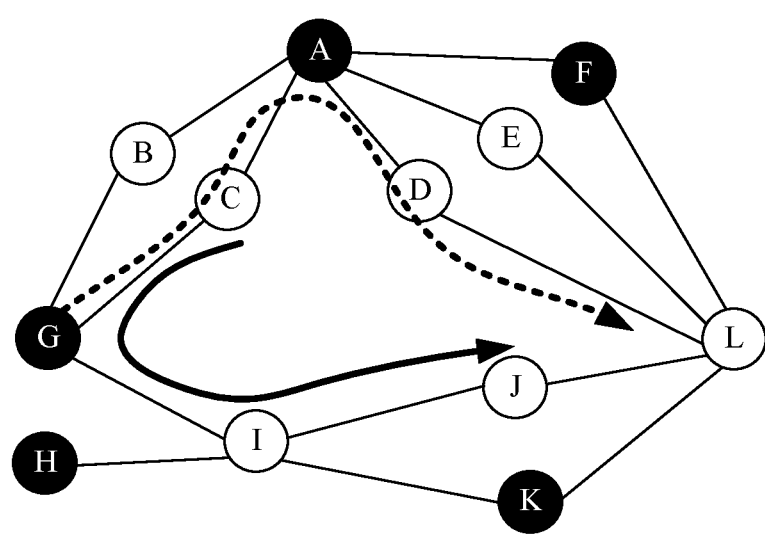
FIG. 4

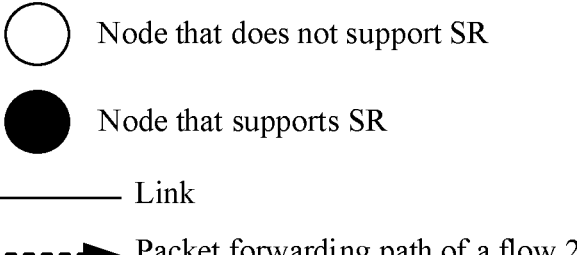
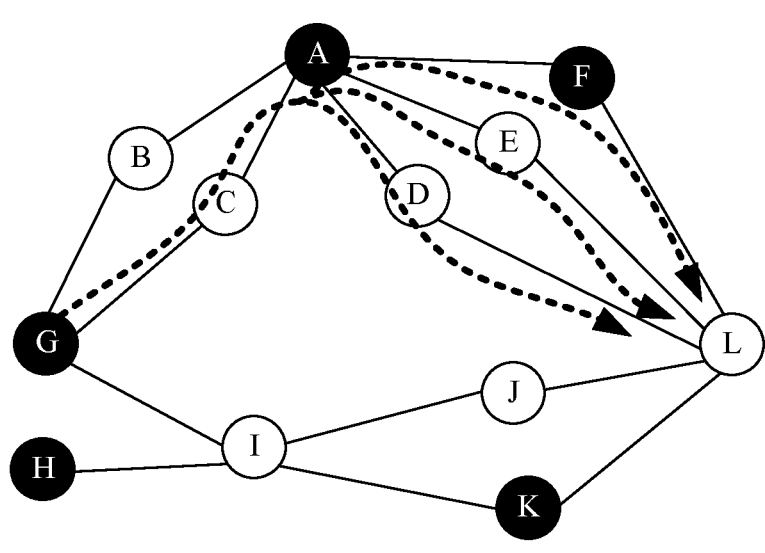
FIG. 7

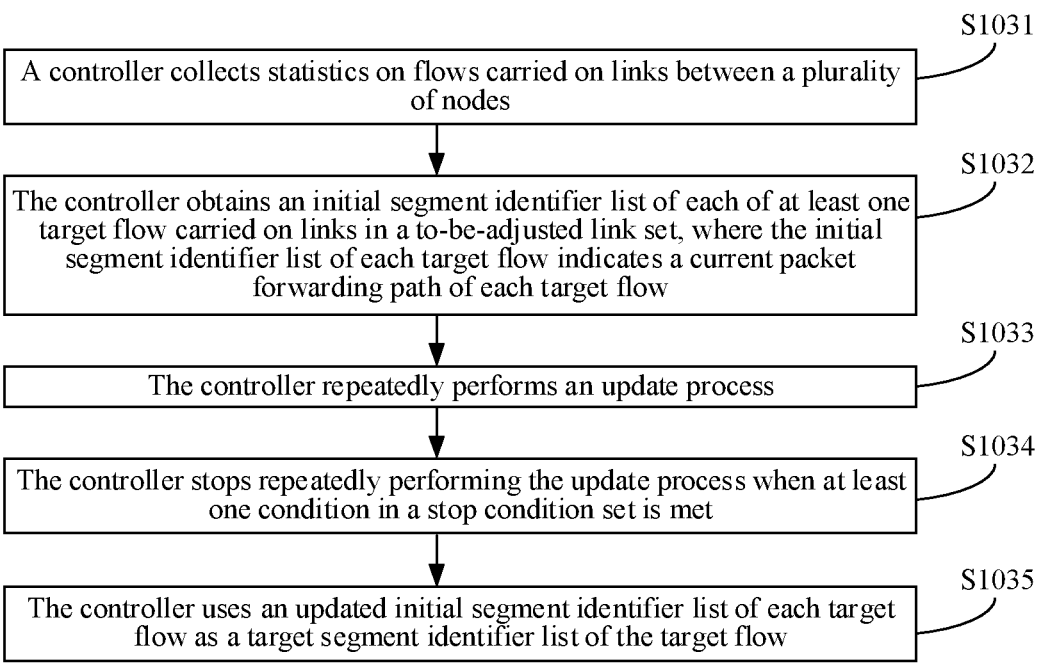

S1031

A controller collects statistics on flows carried on links between a plurality of nodes

S1032

The controller obtains an initial segment identifier list of each of at least one target flow carried on links in a to-be-adjusted link set, where the initial segment identifier list of each target flow indicates a current packet forwarding path of each target flow

S1033

The controller repeatedly performs an update process

S1034

The controller stops repeatedly performing the update process when at least one condition in a stop condition set is met

S1035

The controller uses an updated initial segment identifier list of each target flow as a target segment identifier list of the target flow

FIG. 8

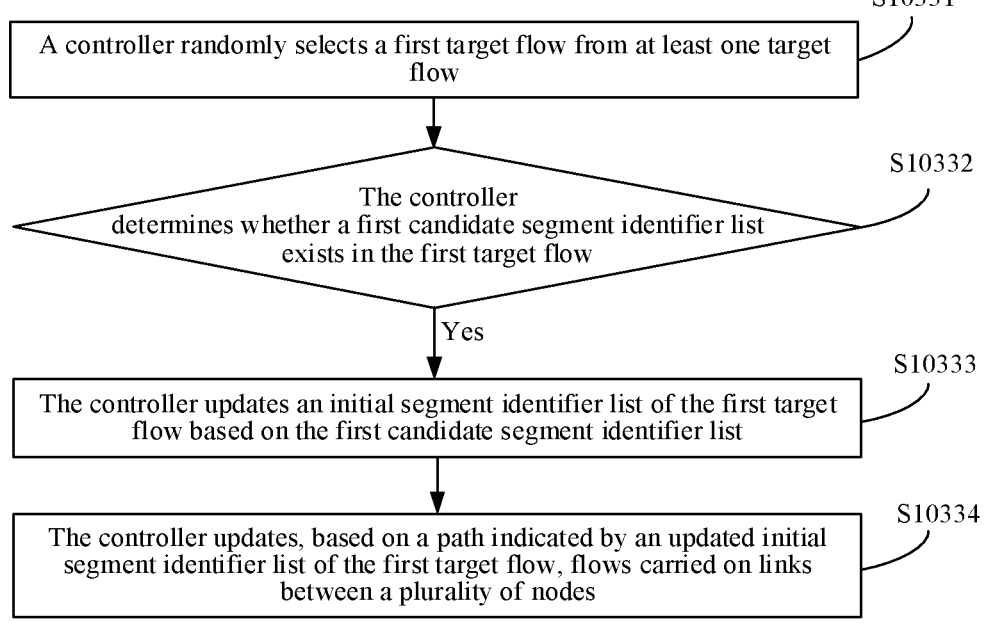

S10331

A controller randomly selects a first target flow from at least one target flow

S10332

The controller determines whether a first candidate segment identifier list exists in the first target flow Yes

S10333

The controller updates an initial segment identifier list of the first target flow based on the first candidate segment identifier list

S10334

The controller updates, based on a path indicated by an updated initial segment identifier list of the first target flow, flows carried on links between a plurality of nodes

FIG. 9

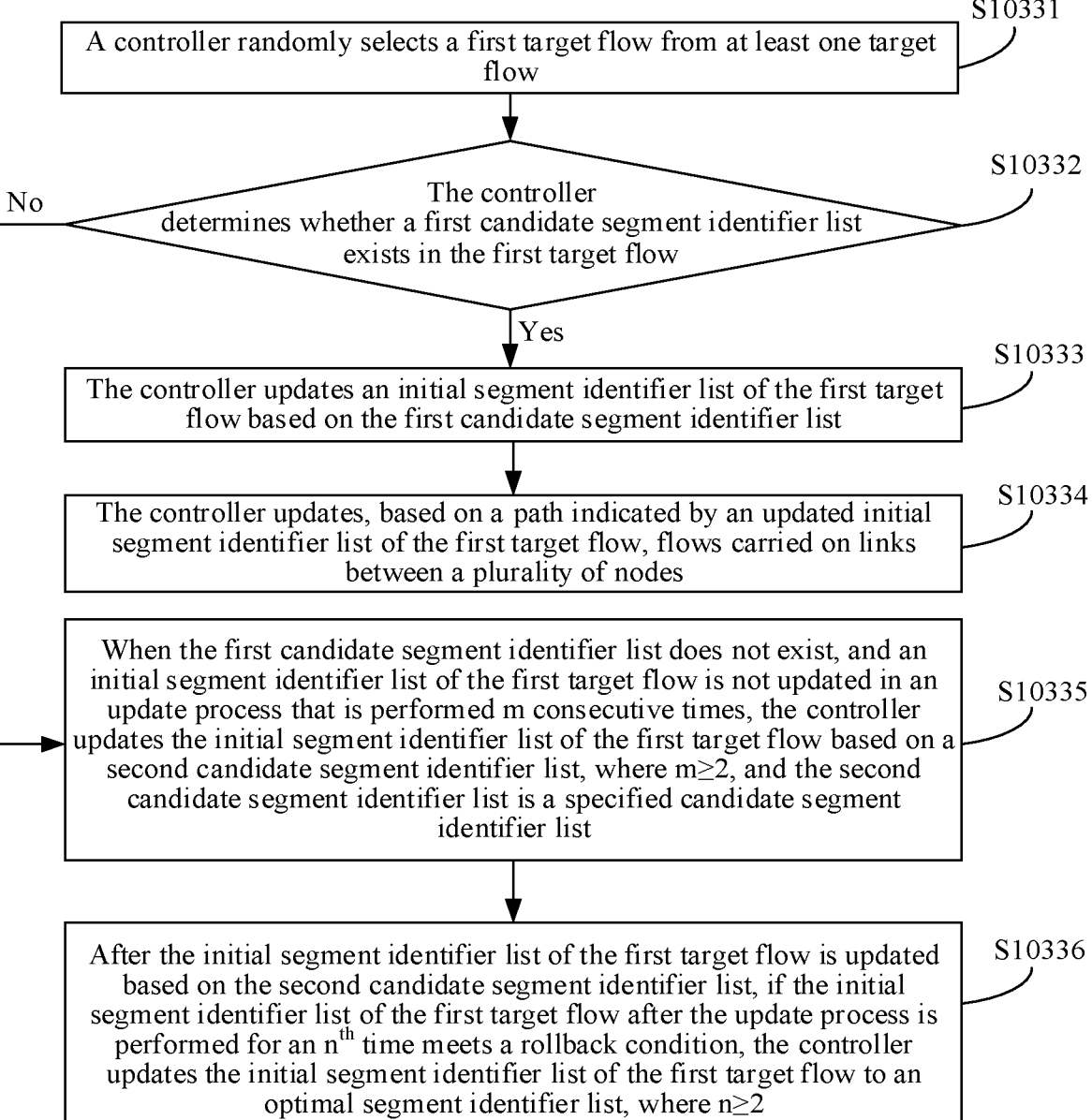

S10331

A controller randomly selects a first target flow from at least one target flow

S10332

The controller determines whether a first candidate segment identifier list exists in the first target flow No Yes

S10333

The controller updates an initial segment identifier list of the first target flow based on the first candidate segment identifier list

S10334

The controller updates, based on a path indicated by an updated initial segment identifier list of the first target flow, flows carried on links between a plurality of nodes

S10335

When the first candidate segment identifier list does not exist, and an initial segment identifier list of the first target flow is not updated in an update process that is performed m consecutive times, the controller updates the initial segment identifier list of the first target flow based on a second candidate segment identifier list, where $m \geq 2$, and the second candidate segment identifier list is a specified candidate segment identifier list

S10336

After the initial segment identifier list of the first target flow is updated based on the second candidate segment identifier list, if the initial segment identifier list of the first target flow after the update process is performed for an $n^{th}$ time meets a rollback condition, the controller updates the initial segment identifier list of the first target flow to an optimal segment identifier list, where $n \geq 2$

FIG. 10

COMMUNICATION METHOD, DEVICE, AND SYSTEM

CROSS-REFERENCE TO RELATED APPLICATIONS

This application is a continuation application of International Patent Application No. PCT/CN2022/075558 filed on Feb. 8, 2022, which claims priority to Chinese Patent Application No. 202110559103.1 filed on May 21, 2021. The disclosures of the aforementioned applications are hereby incorporated by reference in their entireties.

TECHNICAL FIELD

This application relates to the field of communication technologies, and in particular, to a communication method, device, and system.

BACKGROUND

A communication system includes a plurality of nodes, and there are links between the nodes. After receiving a packet of a flow, a source node of the flow in the communication system may forward the packet of the flow to a sink node of the flow along a packet forwarding path that passes through at least one link.

Usually, after receiving a packet of a flow, a source node determines, based on a sink node to which the packet of the flow needs to be forwarded, a path from the source node to the sink node by using a shortest path first (SPF) algorithm. Then, the source node may forward the packet of the flow to the sink node along the path. A large quantity of best effort (BE) services are deployed in the network. If packets of a plurality of flows are forwarded over paths obtained by using the SPF algorithm, the packets of these flows may be forwarded over links between some nodes. As a result, the links encounter performance bottlenecks, causing link traffic congestion and affecting packet forwarding efficiency.

SUMMARY

This application provides a communication method, a device, and a system. According to the communication method, a target segment identifier list can be sent to a source node of a target flow in a communication network, to indicate a packet forwarding path of the target flow, thereby reducing network link congestion, and improving packet forwarding efficiency. The technical solutions are as follows.

According to a first aspect, a communication method is provided. The method is performed by a controller. The controller is communicatively connected to a plurality of nodes. The plurality of nodes belongs to a same communication network. The method includes that after determining a node set, the controller first determines a target flow from flows carried on links between the plurality of nodes, and obtains a target segment identifier list of the target flow. Then, the controller sends the target segment identifier list to a source node, to indicate the source node to forward a packet of the target flow based on the target segment identifier list. The node set determined by the controller includes a node in the plurality of nodes that supports segment routing (SR). A source node of the target flow in the communication network belongs to the node set. The target segment identifier list includes a segment identifier of a sink node of the target flow in the communication network and a segment identifier of at least one intermediate node. The intermediate node belongs to the node set and is located on a path between the source node and the sink node.

According to the communication method provided in this application, the target segment identifier list can be sent to the source node of the target flow in the communication network, to indicate a packet forwarding path of the target flow, thereby reducing network link congestion, and improving packet forwarding efficiency. In addition, the method is applicable to a case in which all nodes in a communication system support SR, a case in which some nodes in the communication system support SR, and a case in which a packet forwarding path of a flow is a path obtained by the node through calculation.

In this application, the controller may specify the packet forwarding path of the target flow by the target segment identifier list. A path indicated by the target segment identifier list of the target flow may be the same as or different from a current packet forwarding path of the target flow.

When the path indicated by the target segment identifier list of the target flow is different from the current packet forwarding path of the target flow, the controller may adjust the packet forwarding path of the target flow by sending the target segment identifier list to the source node of the target flow in the communication network.

Optionally, packet transmission efficiency of the path indicated by the target segment identifier list of the target flow may be higher than packet transmission efficiency of the current packet forwarding path of the target flow. For example, a performance problem occurs on a node through which the current packet forwarding path of the target flow passes, or congestion or a fault occurs on a link between two nodes. As a result, a service level protocol indicator of a service-level agreement (SLA) such as a delay or a packet loss rate of a packet in the target flow deteriorates, and network performance deteriorates. In this case, the packet forwarding path of the target flow is adjusted, so that forwarding efficiency of the target flow can be improved, and network performance can be improved.

Optionally, packet transmission efficiency of the path indicated by the target segment identifier list of the target flow may be lower than packet transmission efficiency of the current packet forwarding path of the target flow. For example, the target flow belongs to a flow with a lower priority, and the current packet forwarding path of the target flow is the same as a packet forwarding path of a flow with a higher priority. In this case, the packet forwarding path of the flow with the higher priority can be protected by adjusting the packet forwarding path of the target flow, to prevent the target flow from affecting packet forwarding of the flow with the higher priority.

When the path indicated by the target segment identifier list of the target flow is the same as the current packet forwarding path of the target flow, in this application, the controller can confirm the current packet forwarding path of the target flow.

Optionally, the method further includes that the controller determines a to-be-adjusted link set from the links between the plurality of nodes before determining the target flow from the flows carried on the links between the plurality of nodes. Links in the to-be-adjusted link set meet an adjustment condition. When determining the target flow from the flows carried on the links between the plurality of nodes, the controller may determine the target flow from the flows carried on the links in the to-be-adjusted link set. In this manner, the controller may first determine the to-be-adjusted link set, and then determine the target flow based on the to-be-adjusted link set.

The adjustment condition may be any condition. For example, the adjustment condition includes that a congestion rate of a link is greater than a first congestion threshold, a link is faulty, or a congestion rate of a link is greater than a first congestion threshold, and congestion probabilities at x future moments are greater than a first congestion probability threshold, and $x \geq 2$. The first congestion threshold and the first congestion probability threshold may be equal or may not be equal.

When the congestion rate of the link is greater than the first congestion threshold, the link is likely to be congested, transmission efficiency of a packet of a flow carried on the link is low, and a packet forwarding path of the flow carried on the link needs to be adjusted. When the link is faulty, a packet of a flow carried on the link cannot be effectively transmitted, and a packet forwarding path of the flow needs to be adjusted. When the congestion rate of the link is greater than the first congestion threshold, and the congestion probability at the x future moments is greater than the first congestion probability threshold, the link is likely to be congested currently and, in the future, current and future transmission efficiency of a flow carried on the link is low, and a packet forwarding path of the flow carried on the link needs to be adjusted.

The adjustment condition may be configured on the node or the controller.

If the adjustment condition is configured on the node, the node determines whether at least one link connected to the node meets the adjustment condition based on link status information such as the congestion rate of the link, a connectivity status of the link, and the adjustment condition. When the at least one link connected to the node meets the adjustment condition, the node may send link information to the controller. The link information indicates that the at least one link meets the adjustment condition. Correspondingly, the controller receives link information sent by at least one of the plurality of nodes, and may determine a link that meets the adjustment condition based on the received link information.

It should be noted that the foregoing "link information" indicates whether the link meets the adjustment condition, and the link information may include a conclusion about whether the link meets the adjustment condition, or may be a parameter related to the conclusion. When the link information includes the conclusion, the controller may determine a link that meets the adjustment condition based on the conclusion. When the link information includes a parameter related to the conclusion, the controller may obtain the conclusion based on the parameter, and further determine a link that meets the adjustment condition.

If the adjustment condition is configured on the controller, the node may report performance data or status information of the node and/or a link connected to the node to the controller. In this case, the controller may collect statistics on and obtain link status information of each node, for example, the congestion rate of the link and the connectivity status of the link, and then the controller may determine a link that meets the adjustment condition based on the adjustment condition and the link status information of each node. The link status information of the node may be status information of at least some links connected to the node.

Optionally, the adjustment condition is configured on both the node and the controller. In this case, the node may determine the configured adjustment condition, and send link information to the controller based on a determined result. The controller may determine the configured adjustment condition based on the received link information, to obtain a link that meets the adjustment condition. It should be noted that the adjustment condition configured on the node may be the same as or different from the adjustment condition configured on the controller. This is not limited in this application.

Optionally, the link information sent by each node further indicates traffic of each of the at least one link at a plurality of historical moments. When determining the to-be-adjusted link set based on the received link information, the controller may first predict traffic of each link at a plurality of future moments based on the traffic of each link at the plurality of historical moments. Then, a to-be-adjusted link is determined based on the traffic of each link at the plurality of future moments. Congestion probabilities of the to-be-adjusted link for at least x future moments are greater than the first congestion probability threshold. Finally, the to-be-adjusted link set is determined based on the to-be-adjusted link.

It can be learned that when a link is easily congested currently and, in the future, the link belongs to the to-be-adjusted link set. In this case, the controller may adjust a packet forwarding path of a target flow carried on the link. In this way, a case in which some links are easily congested currently but are not easily congested in the future is avoided, and packet forwarding paths of target flows carried on these links are adjusted, thereby avoiding large network flapping caused by frequent adjustment of the packet forwarding paths.

For example, a link in the to-be-adjusted link set carries at least one target flow. For at least some of the at least one target flow, a path indicated by the target segment identifier list of the target flow is different from a current packet forwarding path of the target flow. In this way, based on the method provided in embodiments of this application, packet forwarding paths of the at least some target flows can be adjusted, to alleviate a degree of network congestion.

The controller may obtain the target segment identifier list of the target flow in a plurality of manners. The following uses one of the manners as an example for description. For example, that the controller obtains the target segment identifier list of the target flow includes that the controller first collects statistics on the flows carried on the links between the plurality of nodes, and obtains an initial segment identifier list of each of the at least one target flow. The initial segment identifier list of each target flow indicates a current packet forwarding path of each target flow. Then, the controller repeatedly performs an update process, and stops repeatedly performing the update process when at least one condition in a stop condition set is met, and uses an updated initial segment identifier list of each target flow as the target segment identifier list of each target flow.

The update process includes randomly selecting a first target flow from the at least one target flow, determining whether a first candidate segment identifier list exists in the first target flow, updating an initial segment identifier list of the first target flow based on the first candidate segment identifier list when the first candidate segment identifier list exists, and updating, based on a path indicated by an updated initial segment identifier list of the first target flow, the flows carried on the links between the plurality of nodes. The first candidate segment identifier list indicates a path from a source node to a sink node of the first target flow. A congestion probability corresponding to the first candidate segment identifier list is less than a congestion probability corresponding to the initial segment identifier list. A congestion probability corresponding to one segment identifier list is an average value of the congestion probabilities of the links in the to-be-adjusted link set when the first target flow is carried on a path indicated by the segment identifier list. The stop condition set includes that a congestion probability corresponding to the updated initial segment identifier list of the first target flow is less than or equal to a second congestion probability threshold.

The congestion probability corresponding to the first candidate segment identifier list is less than the congestion probability corresponding to the initial segment identifier list. When the first target flow is carried on the path indicated by the first candidate segment identifier list, the average value of the congestion probabilities of the links in the to-be-adjusted link set can be reduced. Therefore, if the packet forwarding path of the first target flow is adjusted to the path indicated by the first candidate segment identifier list, a congestion probability of a link in the to-be-adjusted link set can be reduced, so that a congestion and fault condition of the link in the to-be-adjusted link set can be alleviated.

The stop condition set includes that a congestion probability corresponding to the updated initial segment identifier list of the first target flow is less than or equal to the second congestion probability threshold. When the condition is met, it indicates that when the packet forwarding path of the first target flow is adjusted to the path indicated by the updated initial segment identifier list of the first target flow, a congestion probability of each link in the to-be-adjusted link set is low. In this case, the foregoing update process does not need to be repeatedly performed.

Further, the stop condition set may further include that duration of repeatedly performing the update process reaches a duration threshold. In other words, if a time of repeatedly performing the update process by the controller reaches the duration threshold, the controller stops repeatedly performing the update process. In this way, an excessively long time for the controller to repeatedly perform the update process is avoided, and path adjustment efficiency is ensured.

Optionally, when the first target flow is carried on the path indicated by the first candidate segment identifier list, a congestion probability of another link that is in the links between the plurality of nodes and that is outside the to-be-adjusted link set is less than or equal to the second congestion probability threshold. When the packet forwarding path of the first target flow is adjusted to the path indicated by the first candidate segment identifier list, a congestion probability of the other link is not greater than or equal to the second congestion probability threshold. Therefore, the congestion probability of the other link is small. It can be learned that in a process of adjusting the packet forwarding path of the first target flow, the congestion probability of the other link is not high. Therefore, a case in which the congestion probability of the other link is high due to adjustment of the packet forwarding path of the first target flow is avoided.

Optionally, when a plurality of candidate segment identifier lists corresponding to the initial segment identifier list of the first target flow exist, the first candidate segment identifier list is a candidate segment identifier list with a smallest congestion probability in the plurality of candidate segment identifier lists.

Optionally, the controller may randomly select a link from the to-be-adjusted link set based on a link selection probability, and randomly select the first target flow from target flows carried on the link based on a flow selection probability. The link selection probability is positively correlated to the congestion rate of the link, and the flow selection probability is positively correlated to the traffic of the flow. In this way, the controller selects a link with a high congestion rate in the to-be-adjusted link set as the first link, and selects a flow with high traffic as the first target flow.

Because the link with the high congestion rate is more likely to be congested and faulty, and the flow with the high traffic is more likely to cause link congestion and a fault, the selected first target flow is used as a flow in the at least one target flow for which a packet forwarding path is preferentially adjusted. In this way, when the link selection probability is positively correlated to the congestion rate of the link, and the flow selection probability is positively correlated to the traffic of the flow, a packet forwarding path of a target flow with high traffic and a high congestion rate of a carried link can be preferentially adjusted.

Optionally, the controller may determine, with reference to a congestion parameter Q, whether the congestion probability corresponding to the first candidate segment identifier list is less than the congestion probability corresponding to the initial segment identifier list. For any link between a plurality of nodes, the congestion parameter Q of the link=$\max((L-Y), 0)$. In this case, L represents a congestion probability of the link, and Y represents a second congestion probability threshold. The second congestion probability threshold is less than or equal to the first congestion probability threshold. When a sum of congestion parameters corresponding to the first candidate segment identifier list is less than a sum of congestion parameters corresponding to the initial segment identifier list, the controller may determine that the congestion probability corresponding to the first candidate segment identifier list is less than the congestion probability corresponding to the initial segment identifier list. A sum of congestion parameters corresponding to a segment identifier list is a sum of congestion parameters Q of links in the to-be-adjusted link set when the first target flow is carried on a path indicated by the segment identifier list.

Optionally, the controller may determine, with reference to the congestion parameter Q, whether a congestion probability of the other link is less than or equal to the second congestion probability threshold. For example, when the congestion parameter of the other link is zero, the controller may determine that the congestion probability of the other link is less than or equal to the second congestion probability threshold.

Optionally, the controller may determine, with reference to the congestion parameter Q, whether a congestion probability corresponding to the updated initial segment identifier list of the first target flow is less than or equal to the second congestion probability threshold. For example, the controller may determine that the congestion probability corresponding to the updated initial segment identifier list of the first target flow is less than or equal to the second congestion probability threshold when a sum of congestion parameters corresponding to the updated initial segment identifier list of the first target flow is zero.

Optionally, the update process further includes that when the first candidate segment identifier list does not exist, and the initial segment identifier list of the first target flow is not updated in the update process that is performed m consecutive times, the controller updates the initial segment identifier list of the first target flow based on a second candidate segment identifier list, and m≥2. The second candidate segment identifier list is a specified candidate segment identifier list.

It should be noted that a purpose of repeatedly performing the update process by the controller is to find a segment identifier list (for example, the first candidate segment identifier list) better than the initial segment identifier list of the first target flow. If the first candidate segment identifier list that meets the gain condition does not exist, and the initial segment identifier list of the first target flow is not updated in the update process that is performed m consecutive times, it indicates that a segment identifier list better than a current initial segment identifier list cannot be found currently, and it indicates that the current initial segment identifier list of the first target flow is a local optimal solution. In this case, the controller may directly update the initial segment identifier list of the first target flow based on the second candidate segment identifier list, to adjust the current initial segment identifier list, and jump out of the local optimal solution, to find a better segment identifier list based on the updated initial segment identifier list.

Optionally, the quantity of the segment identifiers in the initial segment identifier list of the first target flow that is updated based on the second candidate segment identifier list decreases. That is, a quantity of segment identifiers in the initial segment identifier list of the first target flow that is updated based on the second candidate segment identifier list is less than a quantity of segment identifiers in the initial segment identifier list of the first target flow before being updated based on the second candidate segment identifier list. In this way, a quantity of segment identifiers in the updated initial segment identifier list of the first target flow is small, to enable the controller to find a better segment identifier list of the first target flow in a subsequent update process.

Optionally, the update process further includes that after the initial segment identifier list of the first target flow is updated based on the second candidate segment identifier list, if the initial segment identifier list of the first target flow after the update process is performed for an nth time meets a rollback condition, the controller updates the initial segment identifier list of the first target flow to an optimal segment identifier list. In this case, n≥2. The rollback condition includes that after the update process is performed for the nth time, a congestion probability corresponding to the initial segment identifier list of the first target flow is greater than a congestion probability corresponding to the optimal segment identifier list. The optimal segment identifier list is a corresponding initial segment identifier list of a first target flow with a minimum congestion probability.

After the initial segment identifier list of the first target flow is updated based on the second candidate segment identifier list, if the initial segment identifier list of the first target flow after the update process is performed for the nth time is still worse than the optimal segment identifier list, it indicates that a better segment identifier list of the first target flow cannot be found in the initial segment identifier list of the first target flow that is updated based on the second candidate segment identifier list. In this case, the controller may update the initial segment identifier list of the first target flow to the optimal segment identifier list.

The controller determines the node set in various manners. For example, each node in the communication system may send node information to the controller, and the node information sent by each node indicates whether the node supports SR. In this case, the controller may determine the node set based on node information sent by all nodes.

According to a second aspect, a communication method is provided. The method is performed by a first node of a plurality of nodes. The plurality of nodes is communicatively connected to a controller. The plurality of nodes belongs to a same communication network. The method includes that after receiving a target segment identifier list of a target flow sent by the controller, the first node forwards a packet of the target flow based on the target segment identifier list of the target flow. The target segment identifier list includes a segment identifier of a sink node of the target flow and a segment identifier of at least one intermediate node. The first node is a source node of the target flow. Both the first node and the intermediate node belong to a node set. The node set includes a node that supports SR in the plurality of nodes, and the intermediate node is located on a path between the source node and the sink node of the target flow.

Optionally, a path indicated by the target segment identifier list is different from a current packet forwarding path of the target flow. In this case, the current packet forwarding path of the target flow can be adjusted according to the communication method provided in this application.

Optionally, at least some links through which a current packet forwarding path of the target flow passes meet an adjustment condition.

The adjustment condition may be configured on the node or the controller.

Optionally, if the adjustment condition is configured on the node, the first node may determine whether a link connected to the first node meets the adjustment condition. When at least one link connected to the node meets the adjustment condition, the node may send link information to the controller, where the link information indicates that the at least one link meets the adjustment condition.

For example, the first node may determine whether at least one link connected to the node meets the adjustment condition based on link status information, for example, a congestion rate of the link, a connectivity status of the link, and the adjustment condition. When the at least one link connected to the first node meets the adjustment condition, the first node may send the link information to the controller, where the link information indicates that the at least one link meets the adjustment condition. Correspondingly, the controller receives link information sent by at least one of the plurality of nodes, and may determine a link that meets the adjustment condition based on the received link information.

It should be noted that the foregoing "link information" indicates whether the link meets the adjustment condition, and the link information may include a conclusion about whether the link meets the adjustment condition, or may be a parameter related to the conclusion. When the link information includes the conclusion, the controller may determine a link that meets the adjustment condition based on the conclusion. When the link information includes a parameter related to the conclusion, the controller may obtain the conclusion based on the parameter, and further determine a link that meets the adjustment condition.

If the adjustment condition is configured on the controller, the first node may report performance data or status information of the node and/or a link connected to the node to the controller. In this case, the controller may collect statistics on and obtain link status information of each node, for example, the congestion rate of the link and the connectivity status of the link, and then the controller may determine a link that meets the adjustment condition based on the adjustment condition and the link status information of each node.

Optionally, the adjustment condition is configured on both the node and the controller. In this case, the node may determine the configured adjustment condition, and send link information to the controller based on a determined result. The controller may determine the configured adjustment condition based on the received link information, to obtain a link that meets the adjustment condition. It should be noted that the adjustment condition configured on the node may be the same as or different from the adjustment condition configured on the controller. This is not limited in this application.

The adjustment condition may be any condition. For example, the adjustment condition includes that a congestion rate of a link is greater than a first congestion threshold, a link is faulty, or a congestion rate of a link is greater than a first congestion threshold, and congestion probabilities at x future moments are greater than a first congestion probability threshold, and x≥2. The first congestion threshold and the first congestion probability threshold may be equal or may not be equal.

When the congestion rate of the link is greater than the first congestion threshold, the link is likely to be congested, transmission efficiency of a packet of a flow carried on the link is low, and a packet forwarding path of the flow carried on the link needs to be adjusted. When the link is faulty, a packet of a flow carried on the link cannot be effectively transmitted, and a packet forwarding path of the flow needs to be adjusted. When the congestion rate of the link is greater than the first congestion threshold, and the congestion probability at the x future moments is greater than the first congestion probability threshold, the link is likely to be congested currently and, in the future, current and future transmission efficiency of a flow carried on the link is low, and a packet forwarding path of the flow carried on the link needs to be adjusted.

Optionally, the link information further indicates traffic of each of the at least one link at a plurality of historical moments.

Optionally, before the receiving a target segment identifier list of a target flow sent by the controller, the method further includes that the first node sends node information to the controller. The node information indicates whether the first node supports SR. Each node in the communication system may send node information to the controller, and the node information sent by each node indicates whether the node supports SR.

According to a third aspect, a communication device is provided. The communication device is a controller. The controller is communicatively connected to a plurality of nodes. The plurality of nodes belongs to a same communication network. The communication device includes a first determining module, a second determining module, an obtaining module, and a sending module. The first determining module is configured to determine a node set. The node set includes a node in the plurality of nodes that supports SR. The second determining module is configured to determine a target flow from flows carried on links between the plurality of nodes. A source node of the target flow in the communication network belongs to the node set. The obtaining module is configured to obtain a target segment identifier list of the target flow. The target segment identifier list includes a segment identifier of a sink node of the target flow in the communication network and a segment identifier of at least one intermediate node. The intermediate node belongs to the node set and is located on a path between the source node and the sink node. The sending module is configured to send the target segment identifier list to the source node, to indicate the source node to forward a packet of the target flow based on the target segment identifier list.

Optionally, the communication device further includes a third determining module configured to determine a to-be-adjusted link set in links between the plurality of nodes.

Links in the to-be-adjusted link set meet an adjustment condition. The second determining module is configured to determine the target flow from flows carried on the links in the to-be-adjusted link set. In this manner, the controller may first determine the to-be-adjusted link set, and then determine the target flow based on the to-be-adjusted link set.

The adjustment condition may be any condition. For example, the adjustment condition includes that a congestion rate of a link is greater than a first congestion threshold, a link is faulty, or a congestion rate of a link is greater than a first congestion threshold, and congestion probabilities at x future moments are greater than a first congestion probability threshold, and x≥2. The first congestion threshold and the first congestion probability threshold may be equal or may not be equal.

The adjustment condition may be configured on the node or the controller.

If the adjustment condition is configured on the node, the node determines whether at least one link connected to the node meets the adjustment condition based on link status information such as the congestion rate of the link, a connectivity status of the link, and the adjustment condition. When the at least one link connected to the node meets the adjustment condition, the node may send link information to the controller. The link information indicates that the at least one link meets the adjustment condition. Correspondingly, the communication device further includes a receiving module configured to receive link information sent by at least one of the plurality of nodes. Link information sent by each of the at least one node indicates that at least one link connected to each node meets the adjustment condition. The third determining module is configured to determine the to-be-adjusted link set based on the received link information. It can be learned that, the communication device that belongs to the controller receives the link information sent by the at least one of the plurality of nodes, and may determine a link that meets the adjustment condition based on the received link information.

If the adjustment condition is configured on the controller, the node may report performance data or status information of the node and/or a link connected to the node to the controller. In this case, the third determining module may be configured to collect statistics on and obtain link status information of each node, for example, the congestion rate of the link and a connectivity status of the link, and then determine a link that meets the adjustment condition based on the adjustment condition and the link status information of each node. The link status information of the node may be status information of at least some links connected to the node.

Optionally, the adjustment condition is configured on both the node and the controller. In this case, the node may determine the configured adjustment condition, and send link information to the controller based on a determined result. The third determining module in the communication device may determine the configured adjustment condition based on the received link information, to obtain a link that meets the adjustment condition. It should be noted that the adjustment condition configured on the node may be the same as or different from the adjustment condition configured on the controller. This is not limited in this application.

Optionally, the link information sent by each node further indicates traffic of each of the at least one link at a plurality of historical moments. The third determining module is configured to predict traffic of each link at a plurality of future moments based on the traffic of each link at the plurality of historical moments, determine a to-be-adjusted link based on the traffic of each link at the plurality of future moments, where congestion probabilities of the to-be-adjusted link for at least x future moments are greater than the first congestion probability threshold, and determine the to-be-adjusted link set based on the to-be-adjusted link.

For example, a link in the to-be-adjusted link set carries at least one target flow. For at least some of the at least one target flow, a path indicated by the target segment identifier list of the target flow is different from a current packet forwarding path of the target flow.

The controller may obtain the target segment identifier list of the target flow in a plurality of manners. The following uses one of the manners as an example for description. The obtaining module is configured to first collect statistics on the flows carried on the links between the plurality of nodes, and obtain an initial segment identifier list of each of the at least one target flow. The initial segment identifier list of each target flow indicates a current packet forwarding path of each target flow. Then, an update process is repeatedly performed, and when at least one condition in a stop condition set is met, repeated execution of the update process is stopped, and an updated initial segment identifier list of each target flow is used as the target segment identifier list of each target flow.

The update process includes randomly selecting a first target flow from the at least one target flow, determining whether a first candidate segment identifier list exists in the first target flow, updating an initial segment identifier list of the first target flow based on the first candidate segment identifier list when the first candidate segment identifier list exists, and updating, based on a path indicated by an updated initial segment identifier list of the first target flow, the flows carried on the links between the plurality of nodes. The first candidate segment identifier list indicates a path from a source node to a sink node of the first target flow. A congestion probability corresponding to the first candidate segment identifier list is less than a congestion probability corresponding to the initial segment identifier list. A congestion probability corresponding to one segment identifier list is an average value of the congestion probabilities of the links in the to-be-adjusted link set when the first target flow is carried on a path indicated by the segment identifier list. The stop condition set includes that a congestion probability corresponding to the updated initial segment identifier list of the first target flow is less than or equal to a second congestion probability threshold.

Optionally, the stop condition set further includes that duration of repeatedly performing the update process reaches a duration threshold.

Optionally, when the first target flow is carried on the path indicated by the first candidate segment identifier list, a congestion probability of another link that is in the links between the plurality of nodes and that is outside the to-be-adjusted link set is less than or equal to the second congestion probability threshold.

Optionally, when a plurality of candidate segment identifier lists corresponding to the initial segment identifier list of the first target flow exist, the first candidate segment identifier list is a candidate segment identifier list with a smallest congestion probability in the plurality of candidate segment identifier lists.

Optionally, the controller may randomly select a link from the to-be-adjusted link set based on a link selection probability, and randomly select the first target flow from target flows carried on the link based on a flow selection probability. In this case, the obtaining module is configured to randomly select a first link from the to-be-adjusted link set based on a link selection probability. The link selection probability is positively correlated to the congestion rate of the link. The obtaining module is further configured to randomly select a first target flow from target flows carried on the first link based on a flow selection probability. The flow selection probability is positively correlated to traffic of the flow.

Optionally, the communication device further includes a fourth determining module, and/or a fifth determining module, and/or a sixth determining module. The fourth determining module is configured to, when a sum of congestion parameters corresponding to the first candidate segment identifier list is less than a sum of congestion parameters corresponding to the initial segment identifier list, determine that the congestion probability corresponding to the first candidate segment identifier list is less than the congestion probability corresponding to the initial segment identifier list. The fifth determining module is configured to, when a sum of congestion parameters corresponding to the updated initial segment identifier list of the first target flow is zero, determine that the congestion probability corresponding to the updated initial segment identifier list of the first target flow is less than or equal to the second congestion probability threshold. The sixth determining module is configured to, when the congestion parameter of the other link is zero, determine that a congestion probability of the other link is less than or equal to the second congestion probability threshold.

A sum of congestion parameters corresponding to one segment identifier list is a sum of congestion parameters of links in the to-be-adjusted link set when the first target flow is carried on a path indicated by the segment identifier list, and for any link between the plurality of nodes, a congestion parameter Q of the link equals to $\max((L-Y), 0)$, where L represents a congestion probability of the link, and Y represents the second congestion probability threshold.

Optionally, the update process further includes updating the initial segment identifier list of the first target flow based on a second candidate segment identifier list when the first candidate segment identifier list does not exist and the initial segment identifier list of the first target flow is not updated in the update process that is performed m consecutive times, where $m \geq 2$, and the second candidate segment identifier list is a specified candidate segment identifier list.

Optionally, the quantity of the segment identifiers in the initial segment identifier list of the first target flow that is updated based on the second candidate segment identifier list decreases.

Optionally, the update process further includes, after the initial segment identifier list of the first target flow is updated based on the second candidate segment identifier list, if the initial segment identifier list of the first target flow after the update process is performed for an nth time meets a rollback condition, updating the initial segment identifier list of the first target flow to an optimal segment identifier list, where $n \geq 2$, and the rollback condition includes, after the update process is performed for the nth time, the congestion probability corresponding to the initial segment identifier list of the first target flow is greater than a congestion probability corresponding to the optimal segment identifier list, where the optimal segment identifier list is a corresponding initial segment identifier list of a first target flow with a minimum congestion probability.

The controller determines the node set in various manners. For example, each node in the communication system may send node information to the controller, and the node information sent by each node indicates whether the node supports SR. In this case, the first determining module is configured to receive node information sent by each of the plurality of nodes. The node information sent by each node indicates whether each node supports SR. The first determining module is further configured to determine the node set based on the node information sent by the plurality of nodes.

According to a fourth aspect, a communication device is provided. The communication device is a first node of a plurality of nodes. The plurality of nodes is communicatively connected to a controller. The plurality of nodes belongs to a same communication network. The communication device includes a receiving module and a forwarding module. The receiving module is configured to receive a target segment identifier list of a target flow sent by the controller. The target segment identifier list includes a segment identifier of a sink node of the target flow and a segment identifier of at least one intermediate node. The first node is a source node of the target flow. Both the first node and the intermediate node belong to a node set. The node set includes a node in the plurality of nodes that supports SR. The intermediate node is located on a path between the source node and the sink node of the target flow. The forwarding module is configured to forward a packet of the target flow based on the target segment identifier list of the target flow.

Optionally, at least some links through which a current packet forwarding path of the target flow passes meet an adjustment condition.

The adjustment condition may be configured on the node or the controller.

Optionally, if the adjustment condition is configured on the node, the first node may determine whether a link connected to the first node meets the adjustment condition. When at least one link connected to the node meets the adjustment condition, the node may send link information to the controller, where the link information indicates that the at least one link meets the adjustment condition. Correspondingly, the communication device further includes a determining module and a first sending module. The determining module is configured to determine whether a link connected to the determining module meets the adjustment condition. The first sending module is configured to send link information to the controller when at least one link connected to the first node meets an adjustment condition. The link information indicates that the at least one link meets the adjustment condition.

For example, the first node may determine whether at least one link connected to the node meets the adjustment condition based on link status information, for example, a congestion rate of the link, a connectivity status of the link, and the adjustment condition. When the at least one link connected to the first node meets the adjustment condition, the first node may send the link information to the controller. The link information indicates that the at least one link meets the adjustment condition. Correspondingly, the controller receives link information sent by at least one of the plurality of nodes, and may determine a link that meets the adjustment condition based on the received link information.

If the adjustment condition is configured on the controller, the communication device further includes a third sending module configured to report performance data or status information of the node and/or a link connected to the node to the controller. In this case, the controller may collect statistics on and obtain link status information of each node, for example, the congestion rate of the link and the connectivity status of the link, and then the controller may determine a link that meets the adjustment condition based on the adjustment condition and the link status information of each node.

Optionally, the adjustment condition is configured on both the node and the controller. In this case, the communication device may determine the configured adjustment condition, and send link information to the controller based on a determined result. Correspondingly, the communication device further includes a determining module, where the determining module is configured to determine whether a link connected to the determining module meets the adjustment condition. The controller may determine the configured adjustment condition based on the received link information, to obtain a link that meets the adjustment condition. It should be noted that the adjustment condition configured on the node may be the same as or different from the adjustment condition configured on the controller. This is not limited in this application.

The adjustment condition may be any condition. For example, the adjustment condition includes that a congestion rate of a link is greater than a first congestion threshold, a link is faulty, or a congestion rate of a link is greater than a first congestion threshold, and congestion probabilities at x future moments are greater than a first congestion probability threshold, and $x \geq 2$. The first congestion threshold and the first congestion probability threshold may be equal or may not be equal.

Optionally, the link information further indicates traffic of each of the at least one link at a plurality of historical moments.

Optionally, a path indicated by the target segment identifier list is different from a current packet forwarding path of the target flow.

Optionally, each node in the communication system may send node information to the controller, and the node information sent by each node indicates whether the node supports SR. Correspondingly, the communication device further includes a second sending module configured to send node information to the controller. The node information indicates whether the first node supports SR.

According to a fifth aspect, a communication device is provided. The communication device includes a processor and a memory. The memory stores a program. The processor is configured to invoke the program stored in the memory, to enable the communication device to perform the communication method according to any design of the first aspect.

According to a sixth aspect, a communication device is provided. The communication device includes a processor and a memory. The memory stores a program. The processor is configured to invoke the program stored in the memory, to enable the communication device to perform the communication method according to any design of the second aspect.

According to a seventh aspect, a communication system is provided. The system includes a controller and a plurality of nodes. The controller is communicatively connected to the plurality of nodes. The plurality of nodes belongs to a same communication network. The controller includes the communication device according to any design of the third aspect. The node includes the communication device according to any design of the fourth aspect. Alternatively, the controller includes the communication device according to any design of the fifth aspect. The node includes the communication device according to any design of the sixth aspect.

According to an eighth aspect, a computer storage medium is provided. The computer storage medium stores a computer program. When the computer program is run on a computer, the computer is enabled to perform the communication method according to any design of the first aspect. Alternatively, when the computer program is run on a computer, the computer is enabled to perform the communication method according to any design of the second aspect.

According to a ninth aspect, a computer program product including instructions is provided. When the computer program product is run on a communication device, the communication device is enabled to perform the communication method according to any design of the first aspect. Alternatively, when the computer program product is run on a communication device, the communication device is enabled to perform the communication method according to any design of the second aspect.

For technical effects brought by any design manner of the second aspect to the ninth aspect, refer to technical effects brought by a corresponding design manner of the first aspect. Details are not described herein again.

BRIEF DESCRIPTION OF DRAWINGS

FIG. 4 is a schematic diagram of another packet forwarding path according to an embodiment of this application;

FIG. 7 is a schematic diagram of another packet forwarding path according to an embodiment of this application;

FIG. 8 is a flowchart of a method for obtaining a target segment identifier list according to an embodiment of this application;

FIG. 9 is a schematic diagram of an update process according to an embodiment of this application;

FIG. 10 is a schematic diagram of another update process according to an embodiment of this application;

DESCRIPTION OF EMBODIMENTS

To make principles and technical solutions of this application clearer, the following further describes implementations of this application in detail with reference to the accompanying drawings.

Figure 1:
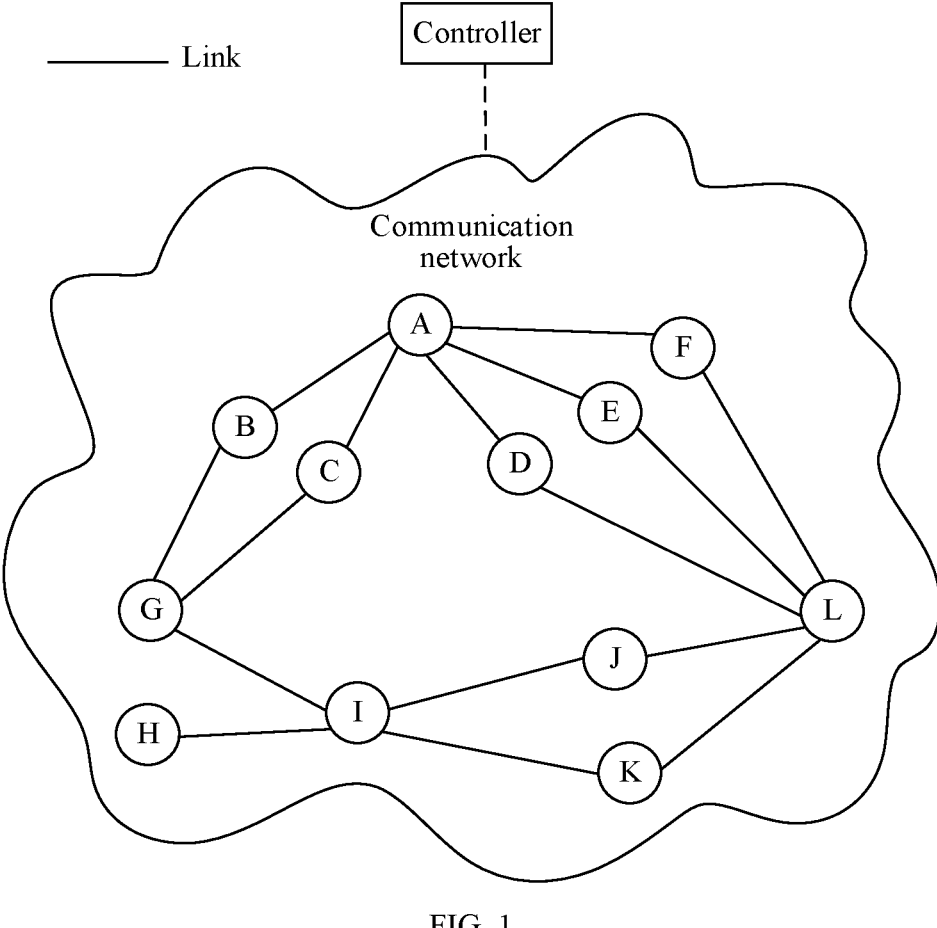
FIG. 1 is a schematic structural diagram of a communication system according to an embodiment of this application.

FIG. 1 is a schematic structural diagram of a communication system according to an embodiment of this application. As shown in FIG. 1, the communication system includes a controller and a plurality of nodes (for example, nodes A, B, C, D, E, F, G, H, I, J, K, and L in FIG. 1). The controller is communicatively connected to the plurality of nodes. These nodes belong to a same communication network, some links exist between the nodes, and the nodes may be communicatively connected by these links.

In FIG. 1, an example in which the communication system includes twelve nodes is used. A quantity of nodes in the communication system may also be another quantity, for example, 100 or 1000. The node may be referred to as a forwarding node, the node has a packet forwarding function, and the node may be a router, a gateway, or the like.

Both the controller and the node in the communication system are communication devices. For example, the communication device may include a processor. The processor is configured to be coupled to a memory and read instructions in the memory, and then perform the method performed by the communication device described in embodiments of this application based on the instructions.

Figure 2:
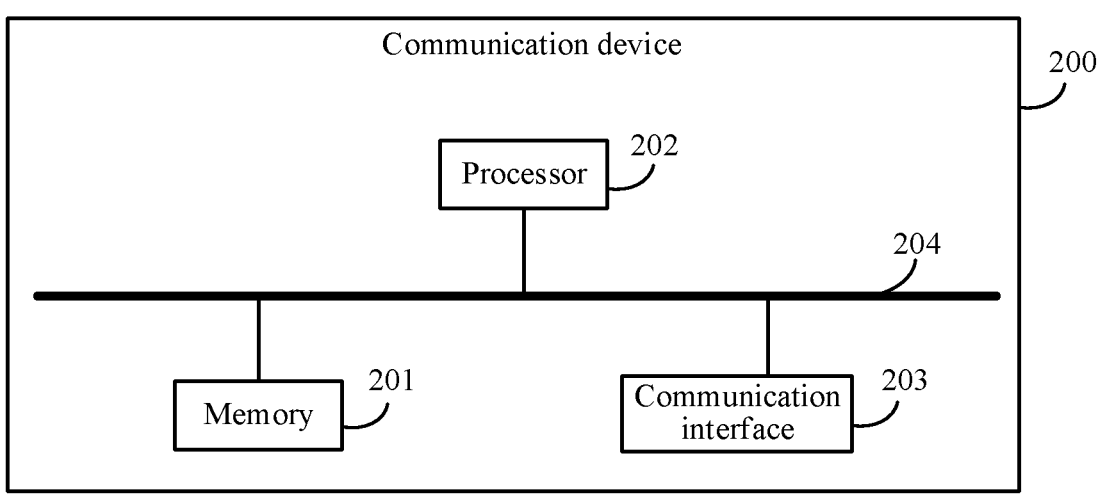
FIG. 2 is a schematic structural diagram of a communication device according to an embodiment of this application.

In the communication device, there may be a plurality of processors, and the memory coupled to the processor may be independent of the processor or the communication device, or may be inside the processor or the network device. The memory may be a physically independent unit, or may be storage space, a web disk, or the like on a cloud server. Optionally, there may be one or more memories. When there is a plurality of memories, the plurality of memories may be located at a same location or different locations, and may be used independently or in cooperation. For example, when the memory is located inside the communication device, refer to FIG. 2. FIG. 2 is a schematic structural diagram of a communication device according to an embodiment of this application. The communication device 200 includes a processor 202 and a memory 201. The memory 201 is configured to store a program. The processor 202 is configured to invoke the program stored in the memory 201, to enable the communication device to perform a corresponding method or function. Optionally, as shown in FIG. 2, the communication device 200 may further include at least one communication interface 203 and at least one communication bus 204. The memory 201, the processor 202, and the communication interface 203 are connected through the communication bus 204. The communication interface 203 is configured to communicate with another device under control of the processor 202, and the processor 202 may invoke the program stored in the memory 201 by the communication bus 204.

A packet forwarding path of at least one flow (also referred to as a service flow) may be deployed in the communication system. The flow may be any type of service flows, for example, a best effort (BE) service flow, a voice video flow, a key service flow, or an interactive service flow. Each flow has a source node and a sink node in a communication network in which a plurality of nodes is located. A packet forwarding path of the flow is a path from the source node to the sink node. A packet of the flow is forwarded by a node on the packet forwarding path.

For example, the packet forwarding path of the flow may be a path of an SR tunnel. The controller generates a policy of the SR tunnel for the flow, and sends the policy of the SR tunnel to a source node (that is, a source node of the flow) of the SR tunnel in the plurality of nodes, to enable the source node to forward the packet of the flow along the path of the SR tunnel based on the policy of the SR tunnel.

For another example, the packet forwarding path of the flow may be a path obtained by the node through calculation. After receiving the packet of the flow, the node calculates the packet forwarding path based on the sink node of the flow in a manner such as an Open Shortest Path First (OSPF)

protocol or an Intermediate System-to-Intermediate System (IS-IS) routing protocol in an Interior Gateway Protocol (IGP), and forwards the packet of the flow along the packet forwarding path.

However, when a plurality of packet forwarding paths deployed in the communication system all pass through a link between two nodes, a large quantity of packets is forwarded on the link, and congestion or a fault may occur on the link. Consequently, an SLA indicator such as a delay and a packet loss rate of a packet in a flow deteriorates, and network performance deteriorates. Therefore, the packet forwarding paths deployed in the communication system need to be adjusted, to reduce a packet forwarding path that passes through the link, reduce a probability that congestion or a fault occurs on the link, optimize the SLA indicator such as a delay and a packet loss rate of a packet in a flow, and improve network performance.

Figure 3:
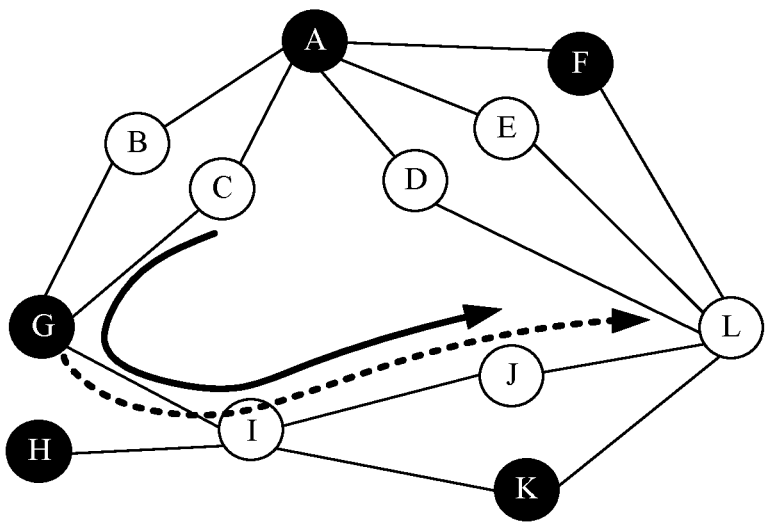
FIG. 3 is a schematic diagram of a packet forwarding path according to an embodiment of this application.

For example, the communication system shown in FIG. 1 is used as an example. As shown in FIG. 3, it is assumed that packet forwarding paths of two flows are deployed in the communication system, and the packet forwarding paths are respectively a packet forwarding path of a flow 1 and a packet forwarding path of a flow 2. The packet forwarding path of the flow 1 is the node C→the node G→the node I→the node J, and the packet forwarding path of the flow 2 is the node G→the node I→the node J→the node L. It can be learned that both the two packet forwarding paths in FIG. 3 pass through a link between the node I and the node J, the link needs to forward packets of the two flows, and the link is prone to congestion or a fault.

If some packet forwarding paths in the packet forwarding paths of the two flows are adjusted to not pass through the link between the node I and the node J, packets that need to be forwarded by the link between the node I and the node J can be reduced, thereby reducing a probability of congestion and a fault on the link. For example, as shown in FIG. 4, the packet forwarding path of the flow 2 may be adjusted to the node G→the node C→the node A→the node D→the node L.

Currently, when a packet forwarding path of a flow is a path of an SR tunnel, a controller may generate a policy of a new SR tunnel for the flow, and send the policy of the new SR tunnel to a source node of the SR tunnel, to enable the source node to delete a policy of an old SR tunnel of the flow, and forward a packet of the flow along a path of the new SR tunnel based on the policy of the new SR tunnel. In this way, the packet forwarding path of the flow can be adjusted. However, in this case, all nodes in the entire communication system are required to support SR. However, in a communication system, some nodes usually support SR, and some other nodes do not support SR. When some nodes do not support SR, this method for adjusting a packet forwarding path is not applicable. If all nodes that do not support SR in the communication system are upgraded to nodes that support SR, it is difficult to upgrade the nodes, and overheads are huge. In addition, when the packet forwarding path of the flow is a path obtained by the node through calculation, the packet forwarding path cannot be adjusted currently.

Embodiments of this application provide a communication method. According to the communication method, a target segment identifier list can be sent to a source node of a target flow in a communication network, to indicate a packet forwarding path of the target flow, thereby reducing network link congestion, and improving packet forwarding efficiency. In addition, the method is applicable to a case in which all nodes in a communication system support SR, a case in which some nodes in the communication system support SR, and a case in which a packet forwarding path of a flow is a path obtained by the node through calculation. In addition, according to the communication method, packet forwarding paths of at least some target flows may be adjusted.

Figure 5:
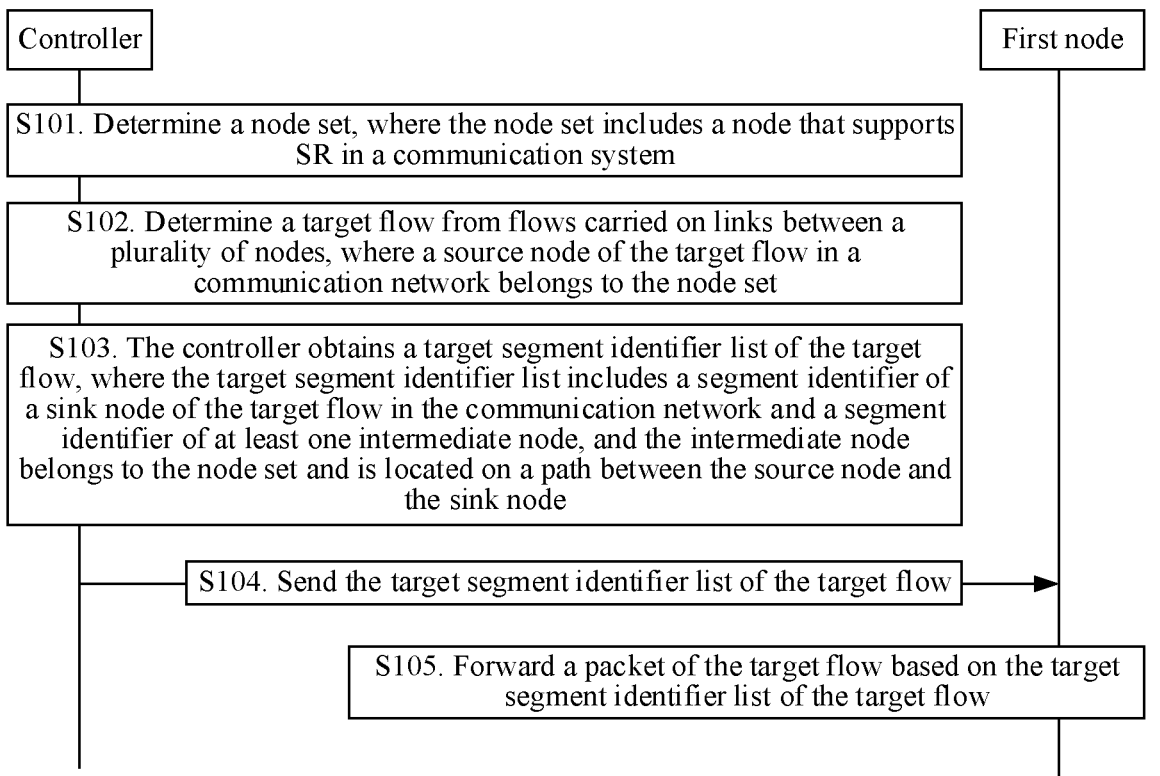
FIG. 5 is a flowchart of a communication method according to an embodiment of this application.

For example, FIG. 5 is a flowchart of a communication method according to an embodiment of this application. The communication method may be applied to a communication system (the communication system shown in FIG. 1) provided in embodiments of this application. As shown in FIG. 5, the communication method includes the following steps.

S101: A controller determines a node set, where the node set includes a node that supports SR in a communication system.

In S101, the controller needs to determine whether each node in the communication system supports SR, to obtain the node set including the node that supports SR, to subsequently adjust a packet forwarding path based on the node set. The node that supports SR supports one or more SR protocols, for example, Segment Routing Multi-Protocol Label Switching (SR MPLS) or Segment Routing Internet Protocol (IP) version 6 (SRv6).

When each node in the communication system supports SR, the node set includes each node in the communication system. When a part of nodes in the communication system support SR, and another part of nodes do not support SR, the node set includes the part of nodes that support SR.

For example, it is assumed that in the scenario shown in FIG. 3, all nodes A, F, G, H, and K support SR, and none of nodes B, C, D, E, I, and J supports SR. In this case, the node set determined by the controller includes the nodes A, F, G, H, and K.

The controller determines the node set in various manners, and the following uses three manners as an example for description.

In a first manner, each node in the communication system may send node information to the controller, and the node information sent by each node indicates whether the node supports SR. In this case, the controller may determine the node set based on node information sent by all nodes.

In a second manner, in the communication system, a node that supports SR may send the node information to the controller, and a node that does not support SR may not send the node information to the controller. In this case, the controller may determine the node set based on the node that sends the node information.

In a third manner, the node set may be pre-configured on the controller, and the controller may directly obtain the node set.

In a fourth manner, the controller may synchronize information about the node that supports SR in the communication system from a third-party system. For example, the third-party system is a network management system of the communication system, and the network management system stores the information about the node that supports SR in the communication system.

S102: The controller determines a target flow from flows carried on links between a plurality of nodes, where a source node of the target flow in a communication network belongs to the node set.

The link between the plurality of nodes in the communication system carries at least one flow, and a packet forwarded on each link is a packet of the flow carried on the link. In S102, the controller may select a to-be-adjusted target flow from flows carried on links between the plurality of nodes based on the node set determined in S101. A source node of the target flow in the communication network in which the plurality of nodes is located belongs to the node set. In other words, the source node of the target flow in the communication network supports SR. The target flow is a flow whose packet forwarding path needs to be adjusted. The target flow may be a flow with low forwarding efficiency. For example, a node on a current packet forwarding path of the target flow is faulty (or congested), or a link between two nodes is faulty (congested).

A manner in which the controller selects the target flow is not limited in embodiments of this application. The following uses one manner as an example for description.

For example, the controller may first determine whether the links between the plurality of nodes meet an adjustment condition, obtain a to-be-adjusted link set based on the determined links that meet the adjustment condition, and then determine a target flow from flows carried on links in the to-be-adjusted link set. The links in the to-be-adjusted link set meet the adjustment condition. It can be learned that, the controller first selects the to-be-adjusted link set, and then selects a target flow that needs to be adjusted from flows (to-be-adjusted flows) carried on links in the to-be-adjusted link set. The to-be-adjusted flow is a flow whose packet forwarding path needs to be adjusted. For each to-be-adjusted flow carried on the link in the to-be-adjusted link set, a source node of the flow in the communication network may support SR, or may not support SR. The target flow is a to-be-adjusted flow carried on the link in the to-be-adjusted link set, and the source node of the target flow in the communication network supports SR.

In some embodiments, the adjustment condition includes: (1) A congestion rate of a link meets a preset condition A. For example, the congestion rate of the link is greater than a first congestion threshold. (2) The link is faulty. (3) A congestion rate of a link meets a preset condition B, and a congestion probability of the link at x future moments or prediction time periods meets a preset condition C, where $x \geq 2$. For example, the congestion rate of the link is greater than a first congestion threshold, and the congestion probability of the link at 10 future moments are greater than a first congestion probability threshold. The first congestion threshold and the first congestion probability threshold may be equal or may not be equal.

In some embodiments, when the congestion rate of the link is greater than the first congestion threshold, the link is likely to be congested, transmission efficiency of a packet of a flow carried on the link is low, and a packet forwarding path of the flow carried on the link needs to be adjusted.

In some embodiments, when the link is faulty, a packet of a flow carried on the link cannot be effectively transmitted, and a packet forwarding path of the flow needs to be adjusted.

In some embodiments, when the congestion rate of the link is greater than the first congestion threshold, and the congestion probability at the x future moments is greater than the first congestion probability threshold, the link is likely to be congested currently and, in the future, current and future transmission efficiency of a flow carried on the link is low, and a packet forwarding path of the flow carried on the link needs to be adjusted.

The adjustment condition may be configured on the node or the controller.

If the adjustment condition is configured on the node, the node determines whether at least one link connected to the node meets the adjustment condition based on link status information such as the congestion rate of the link, a connectivity status of the link, and the adjustment condition. When the at least one link connected to the node meets the adjustment condition, the node may send link information to the controller. The link information indicates that the at least one link meets the adjustment condition. Correspondingly, the controller receives link information sent by at least one of the plurality of nodes, and may determine a link that meets the adjustment condition based on the received link information.

It should be noted that the foregoing "link information" indicates whether the link meets the adjustment condition, and the link information may include a conclusion about whether the link meets the adjustment condition, or may be a parameter related to the conclusion. When the link information includes the conclusion, the controller may determine a link that meets the adjustment condition based on the conclusion. When the link information includes a parameter related to the conclusion, the controller may obtain the conclusion based on the parameter, and further determine a link that meets the adjustment condition.

Before determining whether the connected link meets the adjustment condition, the node first needs to obtain the adjustment condition. The adjustment condition may be configured on the node by a staff member, or may be configured on the controller by a staff member and sent by the controller to the node. This is not limited in embodiments of this application.

If the adjustment condition is configured on the controller, the node reports performance data or status information of the node and/or a link connected to the node to the controller. The controller collects statistics and obtains link status information of each node, such as a congestion rate of the link and a connectivity status of the link, and determines a link that meets the adjustment condition based on the adjustment condition and the link status information of each node. The link status information of the node may be status information of at least some links connected to the node.

Optionally, an adjustment condition may be configured on both the node and the controller. In this case, the node may determine the configured adjustment condition, and send link information to the controller based on a determined result. The controller may determine the configured adjustment condition based on the received link information, to obtain a link that meets the adjustment condition. It should be noted that the adjustment condition configured on the node may be the same as or different from the adjustment condition configured on the controller. This is not limited in this application.

In the foregoing content, an example in which the controller first selects the to-be-adjusted link set, and then selects the target flow from the flows carried on the links in the to-be-adjusted link set is used. Certainly, the controller may alternatively select at least one flow whose source node supports SR from the flows carried on the links between the plurality of nodes, and then randomly select one flow from the at least one flow as the target flow.

S103. The controller obtains a target segment identifier list of the target flow. The target segment identifier list includes a segment identifier of a sink node of the target flow in the communication network and a segment identifier of at least one intermediate node, where the intermediate node belongs to the node set and is located on a path between the source node and the sink node.

After determining a target flow of a to-be-adjusted packet forwarding path, the controller may obtain the target segment identifier list of the target flow. A segment identifier (SID) list indicates a data transmission path. The target segment identifier list indicates a path. The controller may adjust the packet forwarding path of the target flow based on the target segment identifier list.

Optionally, a path indicated by the target segment identifier list of the target flow is different from a current packet forwarding path of the target flow, so that the current packet forwarding path of the target flow is adjusted. Optionally, a path indicated by the target segment identifier list of the target flow may be the same as a current packet forwarding path of the target flow. This is not limited in embodiments of this application. When the controller determines at least one target flow, for at least some of the at least one target flow, the path indicated by the target segment identifier list of the target flow is different from the current packet forwarding path of the target flow.

The target segment identifier list includes a segment identifier of a sink node of the target flow in the communication network and a segment identifier of at least one intermediate node. In addition, the at least one intermediate node supports SR, and the source node of the target flow in the communication network also supports SR. In this way, it can be ensured that the source node and the at least one intermediate node have a capability of forwarding a packet based on the path indicated by the target segment identifier list.

S104. The controller sends the target segment identifier list of the target flow to a first node, where the first node is a source node of the target flow in the communication network.

The target segment identifier list can indicate a new packet forwarding path of the target flow. After obtaining the target segment identifier list, the controller may send the target segment identifier list to the source node of the target flow in the communication network, to indicate the source node to forward a packet of the target flow based on the target segment identifier list.

S105. The first node forwards the packet of the target flow based on the target segment identifier list of the target flow.

Regardless of the manner in which the first node forwards the packet of the target flow before S105, after receiving the target segment identifier list, the first node may directly forward the packet of the target flow based on the target segment identifier list.

For example, when forwarding the packet of the target flow, the first node may encapsulate the target segment identifier list of the target flow into the packet, and send the encapsulated packet to a node indicated by a first segment identifier in the target segment identifier list. After receiving the packet, a node indicated by each segment identifier in the target segment identifier list forwards the packet to a node indicated by a next segment identifier until the packet is sent to the sink node of the target flow in the communication network.

For example, as shown in FIG. 4, it is assumed that a path indicated by the target segment identifier list of the target flow is the node G→the node A→the node L, and the controller sends the target segment identifier list to the node G. After receiving the packet of the target flow, the node G encapsulates the target segment identifier list into the packet, and sends the packet obtained through encapsulation to the node A. After receiving the packet, the node A sends the packet to the node L.

Optionally, if the two nodes are not directly connected, and one of the two nodes needs to forward a packet to the other node, the node may calculate a path to the other node (for example, calculate a path based on an IGP or an SPF manner), and forward the packet to the other node along the path.

For example, still refer to FIG. 4. It is assumed that the node G needs to forward a packet to the node A. In this case, the node G may calculate a path to the node A (the node G→the node C→the node A), and forward the packet to the node A along the path. It is assumed that the node A needs to forward a packet to the node L. In this case, the node A may calculate a path to the node L (the node A→the node D→the node L), and forward the packet to the node L along the path.

Figure 6:
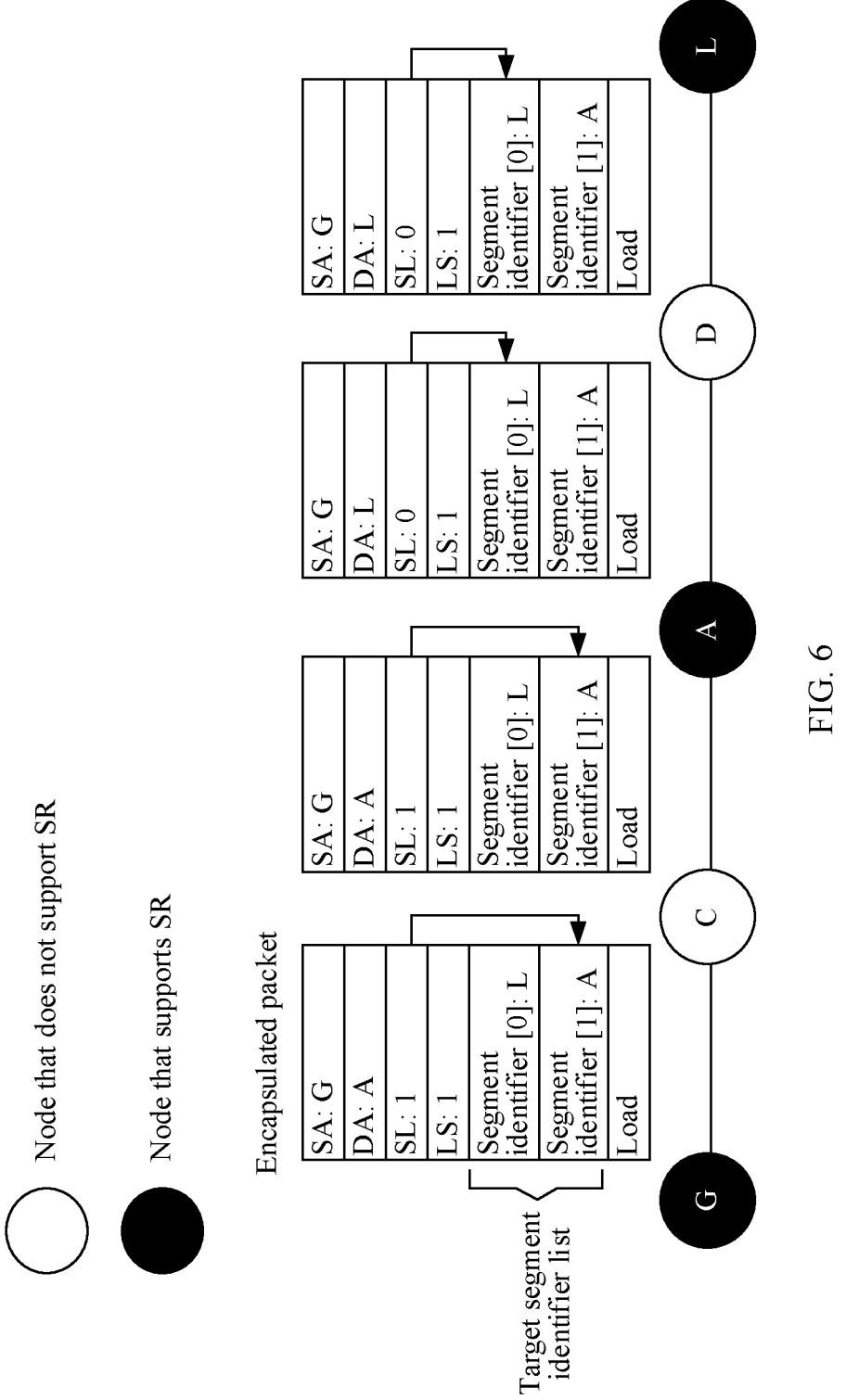
FIG. 6 is a schematic diagram of a packet forwarding process according to an embodiment of this application.

For example, a packet encapsulated by the node G is shown in FIG. 6. The packet includes: a source address (SA), a destination address (DA), a quantity of intermediate nodes that should still be accessed before reaching a node indicated by the destination address (SL), a segment identifier index of the node indicated by the DA (LS), a target segment identifier list, and a payload (including content of the encapsulated packet). The node G supports SR. The node G may search a routing table based on the DA in the encapsulated packet to learn that a next hop route whose DA is A is C, and then forward the packet to the node C. After receiving the packet, the node C finds that the node indicated by the DA is not the node C, and searches the routing table to learn a direct route whose DA is A. In this case, the node C sends the packet to the node A through an outbound interface. The node A supports SR. After receiving the packet, the node A finds that the node indicated by the DA is the node A itself. In this case, the node A may read a target segment identifier list in a packet encapsulation, modify the DA to an address of the node L indicated by the next segment identifier based on the target segment identifier list in the packet, and subtract 1 from the SL, to update the packet. Afterwards, the node A may search the routing table based on the DA in the updated packet to learn that the next hop route whose DA is L is D, and then send the updated packet to the node D. After receiving the packet, the node D finds that the node indicated by the DA is not the node D. In this case, the node D searches the routing table to learn a direct route whose DA is L, and may send the packet to the node L through the outbound interface. After receiving the packet, the node L finds that the node indicated by the DA is the node L itself, and no next segment identifier exists in the target segment identifier list. In this case, the node L may parse the packet to obtain a payload in the packet.

Further, the path obtained by the node through calculation may be a shortest path, for example, an equal cost multi-path (ECMP) shortest path. This is not limited in embodiments of this application.

For example, the flow 2 in FIG. 3 is still used as the target flow. Refer to FIG. 7. It is assumed that a path indicated by a target segment identifier list of a target flow is the node G→the node A→the node L. When the node A forwards a packet of the target flow to the node L, if a calculated shortest ECMP path from the node A to the node L includes a path 1 (the node A→the node D→the node L), a path 2 (the node A→the node E→the node L), and a path 3 (the node A→the node F→the node L), the node A may forward the packet of the target flow to the node L by the paths 1, 2, and 3.

In embodiments of this application, the source node of the target flow in the communication network may forward the packet of the target flow based on the target segment identifier list of the target flow, and a path indicated by the target segment identifier list is different from a current packet forwarding path of the target flow. Therefore, the packet forwarding path of the target flow can be adjusted. In addition, the intermediate node on the path indicated by the target segment identifier list does not need to maintain information about the path, but directly forwards the packet based on the received packet encapsulated by the source node, thereby reducing a load of the intermediate node.

It can be learned that when each node in the communication system supports SR, when some nodes in the communication system support SR, and when a packet forwarding path of a flow is a path obtained by the node through calculation, the controller can determine a target flow from flows carried on links between a plurality of nodes, and adjust a packet forwarding path of the target flow by sending a target segment identifier list to a source node of the target flow in the communication network.

In addition, a target flow of the adjusted packet forwarding path may be any type of service flow, as long as the service flow has the feature of the target flow. In this way, a case in which a packet forwarding path is adjusted for some types of service flows but a packet forwarding path cannot be adjusted for some other types of service flows is avoided.

When at least one link carried in the target flow meets the adjustment condition, adjusting the packet forwarding path of the target flow can further alleviate congestion and a fault of the at least one link, and improve packet forwarding efficiency in the communication system.

In addition, in embodiments of this application, the node (or the controller) may determine whether a link connected to the node meets the adjustment condition, to trigger adjustment of a packet forwarding path of a flow. In this way, automatic adjustment of the packet forwarding path of the flow is implemented, and the packet forwarding path of the flow is adjusted in a timely manner, to avoid occurrence of link congestion and a fault as much as possible, and avoid a case in which a staff member manually triggers the controller to adjust the packet forwarding path of the flow.

After adjusting the packet forwarding path of the target flow, the controller may present the adjusted packet forwarding path of the target flow to the staff member. For example, the communication system provided in embodiments of this application further includes a management device. The management device is connected to the controller. The controller may send the adjusted packet forwarding path to the management device, and the management device may present the packet forwarding path to the staff member.

When the communication system includes the management device, the staff member may configure, on the management device, information (such as the foregoing adjustment condition) that needs to be configured on the controller, and then the management device sends the information to the controller.

Optionally, when the adjustment condition in S102 includes that the congestion rate of the link is greater than the first congestion threshold, when at least one link connected to each node meets the adjustment condition, the link information sent to the controller may further indicate traffic of each of the at least one link at a plurality of historical moments.

When determining a to-be-adjusted link set based on the received link information, the controller may first determine a link indicated by the received link information, and then, the controller may predict traffic of the link at a plurality of future moments based on the traffic of the link at the plurality of historical moments, and determine whether the link is a to-be-adjusted link based on traffic of each link at the plurality of future moments, to obtain a to-be-adjusted link set including to-be-adjusted links. Congestion probabilities of the to-be-adjusted link for at least x future moments are greater than the first congestion probability threshold.

In this case, a link in the to-be-adjusted link set not only meets the adjustment condition (the congestion rate of the link is greater than the first congestion threshold), but also meets a condition that congestion probabilities of the link at the at least x future moments in a plurality of future moments are greater than the first congestion probability threshold. In other words, the link in the to-be-adjusted link set has a high congestion probability currently and in the future.

Optionally, when the adjustment condition in S102 includes that the congestion rate of the link is greater than the first congestion threshold, and congestion probabilities at x future moments are greater than the first congestion probability threshold, when at least one link connected to each node meets the adjustment condition, the link information sent to the controller may further indicate traffic of each of the at least one link at a plurality of historical moments.

When determining the to-be-adjusted link set based on the received link information, the controller may first obtain the to-be-adjusted link set based on a link indicated by the received link information. Then, the controller may predict traffic of each link in the to-be-adjusted link set at a plurality of future moments based on the traffic of the link at the plurality of historical moments, and check whether the link is a to-be-adjusted link based on the traffic of the link at the plurality of future moments, and when a link is not a to-be-adjusted link, remove the to-be-adjusted link from the to-be-adjusted link set.

In this case, the node needs to determine a current congestion rate of the link and predict a congestion probability of the link at a future moment, to determine whether the link meets the adjustment condition. The controller needs to predict a congestion probability of the link at a future moment, to check whether a link in the to-be-adjusted link set meets the adjustment condition. In this way, the node and the controller separately predict whether the link is easily congested in the future, thereby improving accuracy of a predicted result.

Optionally, when the adjustment condition in S102 includes that the congestion rate of the link is greater than the first congestion threshold, and congestion probabilities at x future moments are greater than the first congestion probability threshold, when at least one link connected to each node meets the adjustment condition, the link information sent to the controller may not indicate traffic of each of the at least one link at a plurality of historical moments. In this way, the controller may not need to perform traffic prediction based on traffic at these historical moments, and an amount of data that needs to be transmitted between the node and the controller is further reduced, bandwidth is saved, and timeliness is stronger.

In embodiments of this application, at least one of the node and the controller can predict a future congestion probability of a link. In addition, when a link is easily congested currently and, in the future, the link belongs to the to-be-adjusted link set. In this case, the controller may adjust a packet forwarding path of a target flow carried on the link. In this way, a case in which some links are easily congested currently but are not easily congested in the future is avoided, and packet forwarding paths of target flows carried on these links are adjusted, thereby avoiding large network flapping caused by frequent adjustment of the packet forwarding paths.

Further, for a device that needs to predict traffic in the controller and the node, the device may input traffic of a link at a plurality of historical moments into a traffic prediction model, to obtain traffic of the link at a plurality of future moments that is output by the traffic prediction model. The traffic prediction model is for outputting the traffic of the link at the plurality of future moments based on the input traffic of the link at the plurality of historical moments. Before the traffic prediction model is used, an initial model may be trained, to obtain the traffic prediction model. An algorithm used by the initial model may be any prediction algorithm, an improvement of any prediction algorithm, a combination of a plurality of prediction algorithms, or the like. These prediction algorithms may be statistical methods or machine learning methods. The statistical method may be an autoregressive integrated moving average model (ARIMA), an exponential weighted moving average model (EWMA), or the like. The machine learning method may be a recurrent neural network (RNN), a long short-term memory (LSTM), a gradient boosting decision tree (GBDT), an extreme gradient boost model (XGBoost), or the like.

In S103, the controller may obtain the target segment identifier list of the target flow in a plurality of manners. The following uses one of the manners as an example for description.

As shown in FIG. 8, the S103 includes the following steps.

S1031: The controller collects statistics on the flows carried on the links between the plurality of nodes.

Before performing S103, the controller may obtain topology information of the communication network, to perform S103 based on the topology information of the communication network. For example, the topology information includes information about each link in the communication network, for example, nodes at two ends of the link, a capacity of the link, a delay of the link, and an affinity attribute of the link. The topology information may further include information about a flow carried on the communication network, for example, a source node and a sink node of the flow, bandwidth required by the flow, a current packet forwarding path of the flow, and a routing condition (such as a delay, a hop count, an affinity attribute, a node that is passed through, and a node that is not passed through) required by the flow.

The topology information of the communication network may be obtained by the controller through statistics collection, or may be configured by a staff member on the controller, or may be configured by a staff member on another device and obtained by the controller from the other device. This is not limited in embodiments of this application.

In S1031, the controller may collect statistics on the flows carried on the links between the plurality of nodes in the communication system based on the topology information of the communication network, to subsequently determine the target segment identifier list based on the statistical result.

S1032: The controller obtains an initial segment identifier list of each of at least one target flow carried on links in the to-be-adjusted link set, where the initial segment identifier list of each target flow indicates a current packet forwarding path of each target flow.

In S1032, the controller may obtain the initial segment identifier list of each target flow carried on the links in the to-be-adjusted link set based on the topology information of the communication network. The initial segment identifier list of the target flow includes a segment identifier of a sink node of the target flow in the communication network and a segment identifier of an intermediate node that supports SR and that is in the current packet forwarding path of the target flow.

It should be noted that, if none of the intermediate nodes in the current packet forwarding path of the target flow supports SR, the initial segment identifier list of the target flow includes only the segment identifier of the sink node of the target flow in the communication network.

For example, the flow 2 in FIG. 3 is used as the target flow. A current packet forwarding path of the flow 2 is the node G→the node I→the node J→the node L. Because neither the node I nor the node J supports SR, an initial segment identifier list of the flow 2 includes only a segment identifier of the node L.

The initial segment identifier list of the target flow may be used as a basis of the target segment identifier. Subsequently, the initial segment identifier list of the target flow may be adjusted and updated, to obtain the target segment identifier list of the target flow.

S1033: The controller repeatedly performs an update process.

After obtaining the flows carried on the links between the plurality of nodes and the initial segment identifier list of each of the at least one target flow through statistics collection, the controller may repeatedly perform the update process based on the information, to obtain the target segment identifier list of the target flow. The update process refers to an update process of the initial segment identifier list of the target flow.

As shown in FIG. 9, the update process includes the following steps.

S10331: The controller randomly selects a first target flow from the at least one target flow.

Each time the update process is performed, the controller may randomly select the first target flow. The first target flows selected in the update process performed for a plurality of times may be the same or may be different.

The controller may select the first target flow in any one of a plurality of manners. The following uses two of the manners as an example for description.

In a first manner, after determining the at least one target flow, the controller may randomly select the first target flow from the at least one target flow.

In a second manner, the controller may first randomly select a first link from the to-be-adjusted link set, and then randomly select the first target flow from target flows carried on the first link.

Optionally, the controller may randomly select a link from the to-be-adjusted link set based on a link selection probability, and randomly select the first target flow from target flows carried on the link based on a flow selection probability. The link selection probability is positively correlated to the congestion rate of the link, and the flow selection probability is positively correlated to the traffic of the flow. In this way, the controller selects a link with a high congestion rate in the to-be-adjusted link set as the first link, and selects a flow with high traffic as the first target flow.

Because the link with the high congestion rate is more likely to be congested and faulty, and the flow with the high traffic is more likely to cause link congestion and a fault, the selected first target flow is used as a flow in the at least one target flow for which a packet forwarding path is preferentially adjusted. In this way, when the link selection probability is positively correlated to the congestion rate of the link, and the flow selection probability is positively correlated to the traffic of the flow, a packet forwarding path of a target flow with high traffic and a high congestion rate of a carried link can be preferentially adjusted.

Optionally, a link selection probability is $$p_e = \frac{u(e)^\alpha}{\sum_{e \in E} u(e)^\alpha}$$

and a flow selection probability is $$p_d = \frac{l(d, e)^\beta}{\sum_{d \in D(e)} l(d, e)^\beta},$$

where u(e) represents a congestion rate of a link e, E represents a to-be-adjusted link set, l(d,e) represents traffic of a flow d carried on the link e, D(e) represents all flows carried on the link e, and both α and β are constants.

The congestion rate in embodiments of this application may be any parameter related to congestion. For example, the congestion rate of the link may be a utilization rate of the link. For example, it is assumed that a capacity (also referred to as a bandwidth) of a link is x1, and a current load of the link is x2. In this case, a congestion rate of the link=a utilization rate of the link=x2/x1.

S10332: The controller determines whether a first candidate segment identifier list exists in the first target flow. When the first candidate segment identifier list exists, S10333 is performed.

After selecting the first target flow, the controller may perform a plurality of adjustments on an initial segment identifier list of the first target flow, to obtain a plurality of candidate segment identifier lists corresponding to the initial segment identifier list of the first target flow. These candidate segment identifier lists are all used to indicate a path from a source node to a sink node of the first target flow. These candidate segment identifier lists each include a segment identifier of the sink node of the first target flow. When the candidate segment identifier list includes a segment identifier of at least one intermediate node, all the intermediate nodes support SR, and the source node and the sink node of the first target flow are reachable through paths of the intermediate nodes.

A plurality of candidate segment identifier lists is all obtained by the controller by adjusting the initial segment identifier list of the first target flow based on the segment identifiers of the nodes in the node set, and the plurality of candidate segment identifier lists are different from each other. The plurality of adjustments may include at least one of the following: inserting a segment identifier into the initial segment identifier list of the first target flow, replacing at least some segment identifiers in the initial segment identifier list of the first target flow, deleting some segment identifiers in the initial segment identifier list of the first target flow, and resetting the initial segment identifier list of the first target flow to the initial segment identifier list of the first target flow obtained in S1032.

For example, as shown in FIG. 3, it is assumed that the first target flow is the flow 2 in FIG. 3, and a current packet forwarding path of the first target flow is the node G→the node I→the node J→the node L. The node set in FIG. 3 includes nodes A, F, G, H, and K, that is, the nodes A, F, G, H, and K all support SR. The initial segment identifier list of the first target flow includes a segment identifier of the node L. The plurality of candidate segment identifier lists obtained by the controller by performing a plurality of adjustments on the initial segment identifier may include: a candidate segment identifier list 1 (the segment identifier of the node A, and the segment identifier of the node L), a candidate segment identifier list 2 (the segment identifier of the node A, the segment identifier of the node F, and the segment identifier of the node L), and a candidate segment identifier list 3 (the segment identifier of the node K, and the segment identifier of the node L). In addition, because the node G and the node L cannot be reached through the node H, the candidate segment identifier list obtained by the controller does not include the segment identifier of the node H.

After obtaining the plurality of candidate segment identifier lists corresponding to the initial segment identifier list of the first target flow, the controller may detect whether each candidate segment identifier list meets a gain condition, and when a candidate segment identifier list meeting the gain condition exists, determine the first candidate segment identifier list based on the candidate segment identifier list meeting the gain condition.

It should be noted that when none of the plurality of candidate segment identifier lists corresponding to the initial segment identifier list of the first target flow meets the gain condition, the controller may determine that the first candidate segment identifier list of the first target flow does not exist. In this case, the update process ends.

For example, the gain condition includes that a congestion probability corresponding to the candidate segment identifier list of the first target flow is less than a congestion probability corresponding to the initial segment identifier list of the first target flow. It should be noted that the congestion probability corresponding to the segment identifier list of the first target flow is an average value of congestion probabilities of links in the to-be-adjusted link set when the first target flow is carried on a path indicated by the segment identifier list. The average value may be any average value, such as an arithmetic average value, a square average value, a weighted average value, or a harmonic average value.

The first candidate segment identifier list of the first target flow meets the gain condition. Therefore, a congestion probability corresponding to the first candidate segment identifier list is less than a congestion probability corresponding to the initial segment identifier list. When the first target flow is carried on the path indicated by the first candidate segment identifier list, the average value of the congestion probabilities of the links in the to-be-adjusted link set can be reduced. Therefore, if the packet forwarding path of the first target flow is adjusted to the path indicated by the first candidate segment identifier list, a congestion probability of a link in the to-be-adjusted link set can be reduced, so that congestion and a fault status of the link in the to-be-adjusted link set can be alleviated.

When determining whether the candidate segment list meets the gain condition, on one hand, the controller may calculate an average value of congestion probabilities of the links in the current to-be-adjusted link set based on the flows carried on the current links between the plurality of nodes that are obtained through statistics collection in S1031, to obtain a congestion probability corresponding to the initial segment identifier list of the first target flow. For example, the controller may calculate a load of each link in the to-be-adjusted link set based on a flow carried on the link, and divide the load of the link by a capacity of the link, to obtain a congestion probability of the link. Then, an average value of the congestion probabilities of the links in the to-be-adjusted link set is calculated based on the congestion probabilities of the links in the to-be-adjusted link set, to obtain the congestion probability corresponding to the initial segment identifier list of the first target flow.

On the other hand, the controller may further calculate an average value of congestion probabilities of links in the to-be-adjusted link set when adjusting the flows carried on the links between the plurality of nodes that are obtained through statistics collection in S1031 to enable the first target flow to be carried on a path indicated by each candidate segment identification list, to obtain a congestion probability corresponding to each candidate segment identifier list of the first target flow. For example, after adjusting the flows carried on the links between the plurality of nodes, the controller may calculate a load of the link based on a flow carried on each link in the to-be-adjusted link set, and divide the load of the link by a capacity of the link, to obtain a congestion probability of the link. Then, an average value of the congestion probabilities of the links in the to-be-adjusted link set is calculated based on the congestion probabilities of the links in the to-be-adjusted link set, to obtain the congestion probability corresponding to each candidate segment identifier list of the first target flow.

After obtaining the congestion probability corresponding to the initial segment identifier list of the first target flow and the congestion probability corresponding to each candidate segment identifier list of the first target flow, the controller may compare the congestion probability corresponding to each candidate segment identifier list of the first target flow with the congestion probability corresponding to the initial segment identifier list, to determine whether a candidate segment identifier list whose corresponding congestion probability is less than the congestion probability corresponding to the initial segment identifier list exists in the plurality of candidate segment identifier lists.

For example, the flow 2 in FIG. 3 is still used as the first target flow. It is assumed that a congestion probability corresponding to the initial segment identifier list of the first target flow is 50%. A plurality of candidate segment identifier lists of the first target flow include the candidate segment identifier lists 1, 2, and 3. In addition, a congestion probability corresponding to the candidate segment identifier list 1 is 40%, a congestion probability corresponding to the candidate segment identifier list 2 is 50%, and a congestion probability corresponding to the candidate segment identifier list 3 is 60%. In this case, the controller may determine that the candidate segment identifier list 1 is a first candidate segment identifier list of the initial segment identifier list.

Optionally, the controller may determine, with reference to a congestion parameter Q, whether the congestion probability corresponding to the first candidate segment identifier list is less than the congestion probability corresponding to the initial segment identifier list. For any link between a plurality of nodes, the congestion parameter Q of the link=max((L−Y), 0), where L represents a congestion probability of the link, Y represents a second congestion probability threshold, and the second congestion probability threshold is less than or equal to the first congestion probability threshold. When a sum of congestion parameters corresponding to the first candidate segment identifier list is less than a sum of congestion parameters corresponding to the initial segment identifier list, the controller may determine that the congestion probability corresponding to the first candidate segment identifier list is less than the congestion probability corresponding to the initial segment identifier list. A sum of congestion parameters corresponding to a segment identifier list is a sum of congestion parameters Q of links in the to-be-adjusted link set when the first target flow is carried on a path indicated by the segment identifier list.

The congestion parameter Q of the link may be alternatively implemented in another manner. For example, the congestion parameter Q of the link=max((load of the link−capacity of the link×Y), 0), where Y represents the second congestion probability threshold.

Optionally, the gain condition further includes, when the first target flow is carried on the path indicated by the candidate segment identifier list, congestion probabilities of other links are all less than or equal to the second congestion probability threshold. Another link is a link that is located outside the to-be-adjusted link set and that is in the links between the plurality of nodes.

The first candidate segment identifier list of the first target flow meets the gain condition. Therefore, when the packet forwarding path of the first target flow is adjusted to the path indicated by the first candidate segment identifier list, a congestion probability of the other link is not greater than or equal to the second congestion probability threshold. Therefore, the congestion probability of the other link is small. It can be learned that in a process of adjusting the packet forwarding path of the first target flow, the congestion probability of the other link is not high. Therefore, a case in which the congestion probability of the other link is high due to adjustment of the packet forwarding path of the first target flow is avoided.

Optionally, when there are a plurality of candidate segment identifier lists that meet the gain condition, the controller may determine a candidate segment identifier list that is in the plurality of candidate segment identifier lists and that corresponds to a minimum congestion probability as the first candidate segment identifier list.

Optionally, the controller may determine, with reference to the congestion parameter Q, whether a congestion probability of the other link is less than or equal to the second congestion probability threshold. For example, when the congestion parameter of the other link is zero, the controller may determine that the congestion probability of the other link is less than or equal to the second congestion probability threshold.

Further, the gain condition may further include another condition. This is not limited in embodiments of this application.

For example, the gain condition further includes a quantity of segment identifiers in the candidate segment identifier list is less than or equal to a quantity threshold, a delay of a path indicated by the candidate segment identifier list is less than or equal to a delay threshold, a path indicated by the candidate segment identifier list passes through a node set in the communication network, the path indicated by the candidate segment identifier list does not pass through the node set in the communication network, the path indicated by the candidate segment identifier list has a set affinity attribute, and the like.

For another example, the candidate segment identifier list of the first target flow may also be not limited to whether to indicate a path from a source node to a sink node of the first target flow. When the candidate segment identifier list includes a segment identifier of at least one intermediate node, the source node, and the sink node of the first target flow are not limited to whether the path is reachable by these intermediate nodes. In this case, the gain condition may further include that the candidate segment identifier list indicates the path from the source node to the sink node of the first target flow, the candidate segment identifier list includes a segment identifier of the sink node of the first target flow, and when the candidate segment identifier list includes a segment identifier of at least one intermediate node, the source node and the sink node of the first target flow are reachable by these intermediate node paths.

The gain condition may be configured by a staff member on the controller, or may be configured by a staff member on another device and obtained by the controller from the other device. This is not limited in embodiments of this application.

S10333: The controller updates the initial segment identifier list of the first target flow based on the first candidate segment identifier list.

When the first candidate segment identifier list exists, the controller may update the initial segment identifier list of the first target flow to the first candidate segment identifier list.

For example, the initial segment identifier list of the first target flow is stored in a storage location of the controller, and the controller may update the initial segment identifier list stored in the storage location to the first candidate segment identifier list in S10333.

S10334: The controller updates, based on a path indicated by an updated initial segment identifier list of the first target flow, the flows carried on the links between the plurality of nodes.

After updating the initial segment identifier list of the first target flow, the controller may update the flows carried on the links between the plurality of nodes (for example, update the links carried on the first target flow) obtained through statistics collection in S1031 based on the path indicated by the updated initial segment identifier list of the first target flow, to be used in a next update process.

S1034: The controller stops repeatedly performing the update process when at least one condition in a stop condition set is met.

In a process of repeatedly performing the update process, the controller may determine the conditions in the stop condition set, and when at least one condition in the stop condition set is met, stop repeatedly performing the update process.

Optionally, the stop condition set includes that a congestion probability corresponding to the updated initial segment identifier list of the first target flow is less than or equal to the second congestion probability threshold. When the condition is met, it indicates that when the packet forwarding path of the first target flow is adjusted to the path indicated by the updated initial segment identifier list of the first target flow, a congestion probability of each link in the to-be-adjusted link set is low. In this case, the foregoing update process does not need to be repeatedly performed.

Optionally, the controller may determine, with reference to the congestion parameter Q, whether a congestion probability corresponding to the updated initial segment identifier list of the first target flow is less than or equal to the second congestion probability threshold. For example, the controller may determine that the congestion probability corresponding to the updated initial segment identifier list of the first target flow is less than or equal to the second congestion probability threshold when a sum of congestion parameters corresponding to the updated initial segment identifier list of the first target flow is zero.

Further, the stop condition set may further include that duration of repeatedly performing the update process reaches a duration threshold. In other words, if a time of repeatedly performing the update process by the controller reaches the duration threshold, the controller stops repeatedly performing the update process. In this way, an excessively long time for the controller to repeatedly perform the update process is avoided, and path adjustment efficiency is ensured.

S1035: The controller uses an updated initial segment identifier list of each target flow as the target segment identifier list of the target flow.

After stopping repeatedly performing the update process, the controller may use the updated initial segment identifier list of each target flow as the target segment identifier list of the target flow, to obtain the target segment identifier list of each target flow.

It can be learned from the foregoing update process that a link in the to-be-adjusted link set carries at least one target flow. For at least some of the at least one target flow, the path indicated by the target segment identifier list of the target flow is different from the current packet forwarding path of the target flow.

Optionally, refer to FIG. 10. Based on FIG. 9, the foregoing update process may further include the following steps.

S10335: When the first candidate segment identifier list does not exist, and the initial segment identifier list of the first target flow is not updated in the update process that is performed m consecutive times, the controller updates the initial segment identifier list of the first target flow based on a second candidate segment identifier list, where m≥2, and the second candidate segment identifier list is a specified candidate segment identifier list.

A purpose of repeatedly performing the update process by the controller is to find a segment identifier list (for example, the first candidate segment identifier list) better than the initial segment identifier list of the first target flow. If the first candidate segment identifier list that meets the gain condition does not exist, and the initial segment identifier list of the first target flow is not updated in the update process that is performed m consecutive times, it indicates that a segment identifier list better than a current initial segment identifier list cannot be found currently, and it indicates that the current initial segment identifier list of the first target flow is a local optimal solution. In this case, the controller may directly update the initial segment identifier list of the first target flow based on the second candidate segment identifier list, to adjust the current initial segment identifier list, and jump out of the local optimal solution, to find a better segment identifier list based on the updated initial segment identifier list.

The second candidate segment identifier list is a specified candidate segment identifier list. The controller may set the second candidate segment identifier list in any one of a plurality of manners. For example, the controller may prestore the second candidate segment identifier list, or the controller may prestore a target adjustment manner for the initial segment identifier list of the first target flow, and the second candidate segment identifier list may be obtained by adjusting the initial segment identifier list of the first target flow in the target adjustment manner.

Optionally, a quantity of segment identifiers in the initial segment identifier list of the first target flow that is updated based on the second candidate segment identifier list is less than a quantity of segment identifiers in the initial segment identifier list of the first target flow before being updated based on the second candidate segment identifier list. In other words, the quantity of the segment identifiers in the initial segment identifier list of the first target flow that is updated based on the second candidate segment identifier list decreases. In this way, a quantity of segment identifiers in the updated initial segment identifier list of the first target flow is small, to enable the controller to find a better segment identifier list of the first target flow in a subsequent update process.

S10336: After the initial segment identifier list of the first target flow is updated based on the second candidate segment identifier list, if the initial segment identifier list of the first target flow after the update process is performed for an nth time meets a rollback condition, the controller updates the initial segment identifier list of the first target flow to an optimal segment identifier list, where $n \geq 2$.

When performing an update process, after performing S10335 to update the initial segment identifier list of the first target flow based on the second candidate segment identifier list, the controller may detect whether the initial segment identifier list of the first target flow that is obtained after the nth update process performed after S10335 is performed meets the rollback condition. If the rollback condition is met, the controller may update the initial segment identifier list of the first target flow to the optimal segment identifier list.

It should be noted that the controller performs the update process to update the initial segment identifier list of the first target flow. In addition, each time after performing the update process, the controller may update the initial segment identifier list of the first target flow, or may not update the initial segment identifier list of the first target flow. After each update process is performed, the initial segment identifier list of the first target flow may be the same as or different from the initial segment identifier list of the first target flow before the update process is performed. After performing the nth update process after S10335 is performed, the controller may obtain an initial segment identifier list of a current first target flow, and detect whether the initial segment identifier list meets the rollback condition.

The rollback condition includes that after the nth update process is performed, a congestion probability corresponding to the initial segment identifier list of the first target flow is greater than a congestion probability corresponding to the optimal segment identifier list.

The optimal segment identifier list is a corresponding initial segment identifier list of a first target flow with a minimum congestion probability. It should be noted that, in a process of repeatedly performing the update process, the controller continuously updates the initial segment identifier list of the first target flow, to enable the initial segment identifier list of the first target flow to continuously change. In these initial segment identifier lists of the first target flow, a congestion probability corresponding to the optimal segment identifier list is the smallest.

After S10335, if the initial segment identifier list of the first target flow after the nth update process is performed is still worse than the optimal segment identifier list, it indicates that a better segment identifier list of the first target flow cannot be found based on the updated initial segment identifier list of the first target flow in S10335. In this case, the controller may update the initial segment identifier list of the first target flow to the optimal segment identifier list.

It should be noted that in the embodiment shown in FIG. 10, an example in which the update process includes S10335 and S10336 is used. Certainly, the update process may not include S10336, or the update process may not include S10335 and S10336. This is not limited in embodiments of this application.

It can be learned from the foregoing recorded solution in embodiments of this application that the first congestion threshold and the first congestion probability threshold may be used as a congestion threshold, and the second congestion probability threshold may be used as an optimization threshold.

In one aspect, when the congestion rate or the congestion probability of the link is greater than the congestion threshold, the link is likely to be congested. In this case, a packet forwarding path of a flow carried on the link needs to be adjusted, to reduce the congestion probability of the link and ensure packet forwarding efficiency of the link. For example, when the congestion rate of the link is greater than the first congestion threshold, adjustment of the packet forwarding path of the flow carried on the link may be triggered, or when the congestion rate of the link is greater than the first congestion threshold, and a future congestion probability of the link is greater than the first congestion probability threshold, adjustment of the packet forwarding path of the flow carried on the link may be triggered.

In another aspect, when the congestion probability of the link is less than or equal to the optimization threshold, the link is less likely to be congested and the packet forwarding efficiency of the link is high. Therefore, after the controller adjusts the packet forwarding path of the target flow carried on the link in the to-be-adjusted link set (a link that is likely to be congested), an average value of congestion probabilities of the links in the to-be-adjusted link set decreases (for example, decreases to a status less than or equal to the second congestion probability threshold). In addition, a congestion probability of the other links whose original congestion rate is low may also be less than or equal to the second congestion probability threshold. It can be learned that after the controller adjusts the packet forwarding path of the target flow carried on the link in the to-be-adjusted link set, a congestion probability of each link between the plurality of nodes may be approximately less than or equal to the optimization threshold.

For example, in FIG. 3, the packet forwarding paths of the flow 1 and the flow 2 both pass through a link between the node I and the node J, a congestion rate of the link is greater than the congestion threshold, and a future congestion probability of the link is also greater than the congestion threshold. In this case, the controller may adjust the packet forwarding path of the flow 2 carried on the link, to enable the congestion probability of each link between the plurality of nodes may be approximately less than or equal to the optimization threshold. For example, the packet forwarding path of the flow 2 is adjusted to the packet forwarding path of the flow 2 shown in FIG. 4.

Optionally, the congestion threshold and the optimization threshold may be prestored in the controller, and the controller may directly obtain the congestion threshold and the optimization threshold. Alternatively, the controller prestores the congestion threshold and a proportion corresponding to the optimization threshold. The controller may directly obtain the congestion threshold, and multiply the congestion threshold by the proportion corresponding to the optimization threshold, to obtain the optimization threshold.

With reference to FIG. 1 to FIG. 10, the foregoing describes in detail the communication methods provided in this application. It may be understood that, to implement the functions described in the foregoing methods, the device needs to include corresponding hardware and/or software modules for performing the functions. This application can be implemented in a form of hardware or a combination of hardware and computer software with reference to the execution processes of the methods described in embodiments disclosed in this specification. Whether a function is performed by hardware or hardware driven by computer software depends on particular applications and design constraints of the technical solutions. A person skilled in the art may use different manners to implement the described functions for each particular application with reference to embodiments, but it should not be considered that the implementation goes beyond the scope of this application.

In this embodiment, a corresponding device may be divided into function modules based on the foregoing method embodiments. For example, function modules may be obtained through division based on corresponding functions, or two or more functions may be integrated into one processing module. The integrated module may be implemented in a form of hardware.

Figure 11:
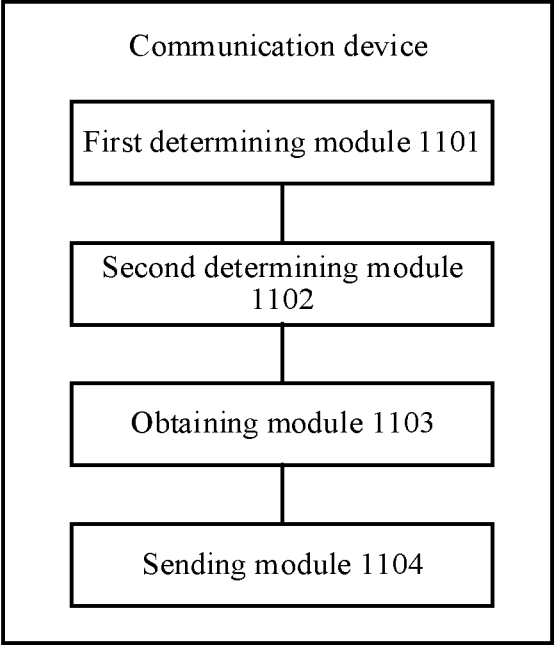
FIG. 11 is a block diagram of a communication device according to an embodiment of this application.
Figure 12:
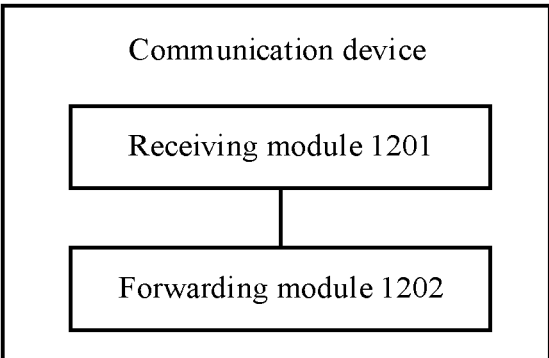
FIG. 12 is a block diagram of another communication device according to an embodiment of this application.

When a function module division manner is used, the following describes a communication device provided in this application with reference to FIG. 11 and FIG. 12.

FIG. 11 is a block diagram of a communication device according to an embodiment of this application. For example, the communication device may belong to the controller in the foregoing embodiments. The controller is communicatively connected to a plurality of nodes, and the plurality of nodes belong to a same communication network. As shown in FIG. 11, the communication device includes a first determining module 1101, a second determining module 1102, an obtaining module 1103, and a sending module 1104.

The first determining module 1101 is configured to determine a node set, where the node set includes a node supporting SR in the plurality of nodes. For an operation performed by the first determining module 1101, refer to the content related to the controller in S101.

The second determining module 1102 is configured to determine a target flow from flows carried on links between the plurality of nodes, where a source node of the target flow in the communication network belongs to the node set. For an operation performed by the second determining module 1102, refer to the content related to the controller in S102.

The obtaining module 1103 is configured to obtain a target segment identifier list of the target flow, where the target segment identifier list includes a segment identifier of a sink node of the target flow in the communication network and a segment identifier of at least one intermediate node, and the intermediate node belongs to the node set and is located on a path between the source node and the sink node. For an operation performed by the obtaining module 1103, refer to the content related to the controller in S103.

The sending module 1104 is configured to send the target segment identifier list to the source node, to indicate the source node to forward a packet of the target flow based on the target segment identifier list. For an operation performed by the sending module 1104, refer to the content related to the controller in S104.

Optionally, the communication device further includes a third determining module configured to determine a to-be-adjusted link set in links between the plurality of nodes, where links in the to-be-adjusted link set meet an adjustment condition, and the second determining module configured to determine the target flow from flows carried on the links in the to-be-adjusted link set. In this manner, the controller may first determine the to-be-adjusted link set, and then determine the target flow based on the to-be-adjusted link set. For an operation performed by the third determining module, refer to the content related to the controller in S102.

The adjustment condition may be any condition. For example, the adjustment condition includes that a congestion rate of a link is greater than a first congestion threshold, a link is faulty, or a congestion rate of a link is greater than a first congestion threshold, and congestion probabilities at x future moments are greater than a first congestion probability threshold, where x≥2. The first congestion threshold and the first congestion probability threshold may be equal or may not be equal.

The adjustment condition may be configured on the node or the controller.

If the adjustment condition is configured on the node, the node determines whether at least one link connected to the node meets the adjustment condition based on link status information such as the congestion rate of the link, a connectivity status of the link, and the adjustment condition. When the at least one link connected to the node meets the adjustment condition, the node may send link information to the controller. The link information indicates that the at least one link meets the adjustment condition. Correspondingly, the communication device further includes a receiving module configured to receive link information sent by at least one of the plurality of nodes, where link information sent by each of the at least one node indicates that at least one link connected to each node meets the adjustment condition, and the third determining module is configured to determine the to-be-adjusted link set based on the received link information. It can be learned that, the communication device that belongs to the controller receives the link information sent by the at least one of the plurality of nodes, and may determine a link that meets the adjustment condition based on the received link information.

If the adjustment condition is configured on the controller, the node may report performance data or status information of the node and/or a link connected to the node to the controller. In this case, the third determining module may be configured to collect statistics on and obtain link status information of each node, for example, the congestion rate of the link and a connectivity status of the link, and then determine a link that meets the adjustment condition based on the adjustment condition and the link status information of each node. The link status information of the node may be status information of at least some links connected to the node.

Optionally, the adjustment condition is configured on both the node and the controller. In this case, the node may determine the configured adjustment condition, and send link information to the controller based on a determined result. The third determining module may determine the configured adjustment condition based on the received link information, to obtain a link that meets the adjustment condition. It should be noted that the adjustment condition configured on the node may be the same as or different from the adjustment condition configured on the controller. This is not limited in this application.

Optionally, the link information sent by each node further indicates traffic of each of the at least one link at a plurality of historical moments. The third determining module is configured to predict traffic of each link at a plurality of future moments based on the traffic of each link at the plurality of historical moments, determine a to-be-adjusted link based on the traffic of each link at the plurality of future moments, where congestion probabilities of the to-be-adjusted link for at least x future moments are greater than the first congestion probability threshold, and determine the to-be-adjusted link set based on the to-be-adjusted link.

For example, a link in the to-be-adjusted link set carries at least one target flow. For at least some of the at least one target flow, a path indicated by the target segment identifier list of the target flow is different from a current packet forwarding path of the target flow.

The controller may obtain the target segment identifier list of the target flow in a plurality of manners. The following uses one of the manners as an example for description. The obtaining module 1103 is configured to collect statistics on the flows carried on the links between the plurality of nodes, and obtain an initial segment identifier list of each of the at least one target flow, where the initial segment identifier list of each target flow indicates a current packet forwarding path of each target flow. Then, an update process is repeatedly performed, and when at least one condition in a stop condition set is met, repeated execution of the update process is stopped, and an updated initial segment identifier list of each target flow is used as the target segment identifier list of each target flow.

The update process includes randomly selecting a first target flow from the at least one target flow, determining whether a first candidate segment identifier list exists in the first target flow, updating an initial segment identifier list of the first target flow based on the first candidate segment identifier list when the first candidate segment identifier list exists, and updating, based on a path indicated by an updated initial segment identifier list of the first target flow, the flows carried on the links between the plurality of nodes, where the first candidate segment identifier list indicates a path from a source node to a sink node of the first target flow, a congestion probability corresponding to the first candidate segment identifier list is less than a congestion probability corresponding to the initial segment identifier list, and a congestion probability corresponding to one segment identifier list is an average value of the congestion probabilities of the links in the to-be-adjusted link set when the first target flow is carried on a path indicated by the segment identifier list, and the stop condition set includes a congestion probability corresponding to the updated initial segment identifier list of the first target flow is less than or equal to a second congestion probability threshold.

For an operation performed by the obtaining module 1103, refer to the foregoing update process shown in FIG. 8.

Optionally, the stop condition set further includes that duration of repeatedly performing the update process reaches a duration threshold.

Optionally, when the first target flow is carried on the path indicated by the first candidate segment identifier list, a congestion probability of another link that is in the links between the plurality of nodes and that is outside the to-be-adjusted link set is less than or equal to the second congestion probability threshold.

Optionally, when a plurality of candidate segment identifier lists corresponding to the initial segment identifier list of the first target flow exist, the first candidate segment identifier list is a candidate segment identifier list with a smallest congestion probability in the plurality of candidate segment identifier lists.

Optionally, the controller may randomly select a link from the to-be-adjusted link set based on a link selection probability, and randomly select the first target flow from target flows carried on the link based on a flow selection probability. In this case, the obtaining module 1103 is configured to randomly select a first link from the to-be-adjusted link set based on a link selection probability, where the link selection probability is positively correlated to the congestion rate of the link, and randomly select a first target flow from target flows carried on the first link based on a flow selection probability, where the flow selection probability is positively correlated to traffic of the flow.

Optionally, the communication device further includes a fourth determining module, and/or a fifth determining module, and/or a sixth determining module. The fourth determining module is configured to, when a sum of congestion parameters corresponding to the first candidate segment identifier list is less than a sum of congestion parameters corresponding to the initial segment identifier list, determine that the congestion probability corresponding to the first candidate segment identifier list is less than the congestion probability corresponding to the initial segment identifier list. The fifth determining module is configured to, when a sum of congestion parameters corresponding to the updated initial segment identifier list of the first target flow is zero, determine that the congestion probability corresponding to the updated initial segment identifier list of the first target flow is less than or equal to the second congestion probability threshold. The sixth determining module is configured to, when the congestion parameter of the other link is zero, determine that a congestion probability of the other link is less than or equal to the second congestion probability threshold.

A sum of congestion parameters corresponding to one segment identifier list is a sum of congestion parameters of links in the to-be-adjusted link set when the first target flow is carried on a path indicated by the segment identifier list, and for any link between the plurality of nodes, a congestion parameter Q of the link equals to $\max((L-Y), 0)$, where L represents a congestion probability of the link, and Y represents the second congestion probability threshold.

Optionally, the update process further includes updating the initial segment identifier list of the first target flow based on a second candidate segment identifier list when the first candidate segment identifier list does not exist and the initial segment identifier list of the first target flow is not updated in the update process that is performed m consecutive times, where m≥2, and the second candidate segment identifier list is a specified candidate segment identifier list.

Optionally, the quantity of the segment identifiers in the initial segment identifier list of the first target flow that is updated based on the second candidate segment identifier list decreases.

Optionally, the update process further includes, after the initial segment identifier list of the first target flow is updated based on the second candidate segment identifier list, if the initial segment identifier list of the first target flow after the update process is performed for an nth time meets a rollback condition, updating the initial segment identifier list of the first target flow to an optimal segment identifier list, where n≥2, and the rollback condition includes, after the update process is performed for the nth time, the congestion probability corresponding to the initial segment identifier list of the first target flow is greater than a congestion probability corresponding to the optimal segment identifier list, where the optimal segment identifier list is a corresponding initial segment identifier list of a first target flow with a minimum congestion probability.

The controller determines the node set in various manners. For example, each node in the communication system may send node information to the controller, and the node information sent by each node indicates whether the node supports SR. In this case, the first determining module 1101 is configured to receive node information sent by each of the plurality of nodes, where the node information sent by each node indicates whether each node supports SR, and determine the node set based on the node information sent by the plurality of nodes.

FIG. 12 is a block diagram of another communication device according to an embodiment of this application. For example, the communication device may belong to a first node of the plurality of nodes in the foregoing embodiments. The plurality of nodes is communicatively connected to a controller, and the plurality of nodes belong to a same communication network. As shown in FIG. 12, the communication device includes a receiving module 1201 and a forwarding module 1202.

The receiving module 1201 is configured to receive a target segment identifier list of a target flow sent by the controller, where the target segment identifier list includes a segment identifier of a sink node of the target flow and a segment identifier of at least one intermediate node, the first node is a source node of the target flow, both the first node and the intermediate node belong to a node set, the node set includes a node in the plurality of nodes that supports SR, and the intermediate node is located on a path between the source node and the sink node of the target flow. For an operation performed by the receiving module 1201, refer to the content related to the first node in S104.

The forwarding module 1202 is configured to forward a packet of the target flow based on the target segment identifier list of the target flow. For an operation performed by the forwarding module 1202, refer to the content related to the first node in S105.

Optionally, at least some links through which a current packet forwarding path of the target flow passes meet an adjustment condition.

The adjustment condition may be configured on the node or the controller.

Optionally, if the adjustment condition is configured on the node, the first node may determine whether a link connected to the first node meets the adjustment condition. When at least one link connected to the node meets the adjustment condition, the node may send link information to the controller, where the link information indicates that the at least one link meets the adjustment condition. Correspondingly, the communication device further includes a first sending module configured to, when at least one link connected to the first node meets the adjustment condition, send the link information to the controller, where the link information indicates that the at least one link meets the adjustment condition.

For example, the first node may determine whether at least one link connected to the node meets the adjustment condition based on link status information, for example, a congestion rate of the link, a connectivity status of the link, and the adjustment condition. When the at least one link connected to the first node meets the adjustment condition, the first node may send the link information to the controller, where the link information indicates that the at least one link meets the adjustment condition. Correspondingly, the controller receives link information sent by at least one of the plurality of nodes, and may determine a link that meets the adjustment condition based on the received link information.

If the adjustment condition is configured on the controller, the communication device further includes a third sending module configured to report performance data or status information of the node and/or a link connected to the node to the controller. In this case, the controller may collect statistics on and obtain link status information of each node, for example, the congestion rate of the link and the connectivity status of the link, and then the controller may determine a link that meets the adjustment condition based on the adjustment condition and the link status information of each node.

Optionally, the adjustment condition is configured on both the node and the controller. In this case, the first node may determine the configured adjustment condition, and send link information to the controller based on a determined result. Correspondingly, the communication device further includes a determining module, where the determining module is configured to determine whether a link connected to the determining module meets the adjustment condition. The controller may determine the configured adjustment condition based on the received link information, to obtain a link that meets the adjustment condition. It should be noted that the adjustment condition configured on the node may be the same as or different from the adjustment condition configured on the controller. This is not limited in this application.

The adjustment condition may be any condition. For example, the adjustment condition includes that a congestion rate of a link is greater than a first congestion threshold, a link is faulty, or a congestion rate of a link is greater than a first congestion threshold, and congestion probabilities at $x$ future moments are greater than a first congestion probability threshold, where $x \geq 2$. The first congestion threshold and the first congestion probability threshold may be equal or may not be equal.

Optionally, the link information further indicates traffic of each of the at least one link at a plurality of historical moments.

Optionally, a path indicated by the target segment identifier list is different from a current packet forwarding path of the target flow.

Optionally, each node in the communication system may send node information to the controller, and the node information sent by each node indicates whether the node supports SR. Correspondingly, the communication device further includes a second sending module (not shown in FIG. 12) configured to send node information to the controller, where the node information indicates whether the first node supports SR.

It should be noted that, in embodiments, division into the modules is an example, and is merely a possible logical function division. During actual implementation, another division manner may be used.

Figure 13:
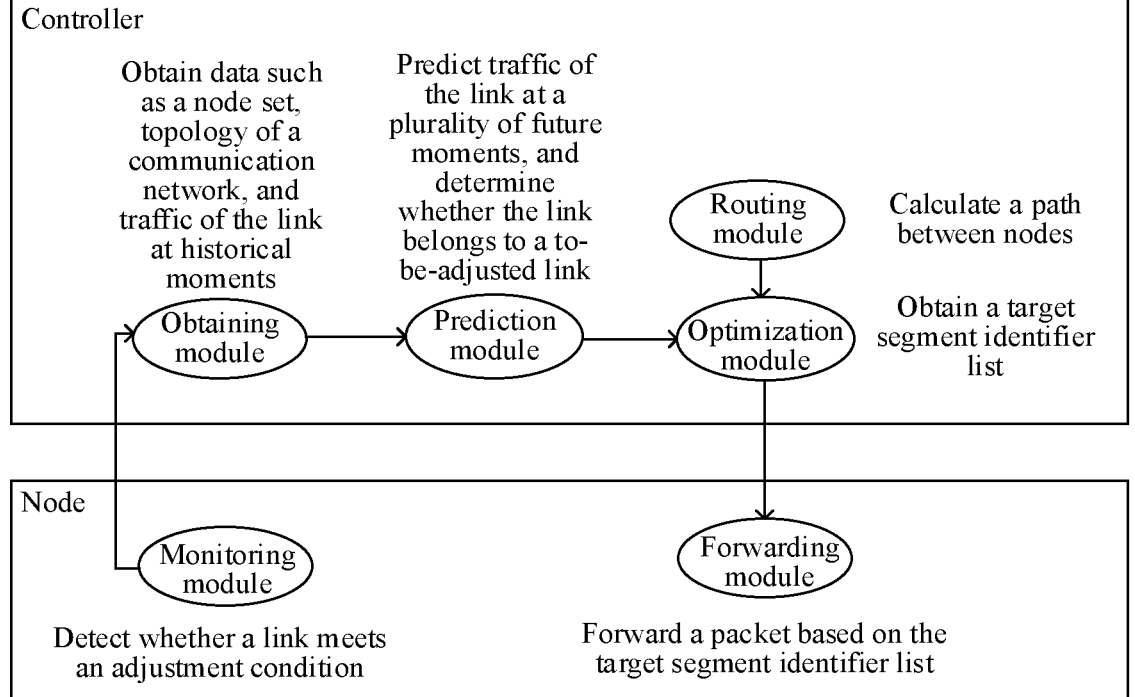
FIG. 13 is a schematic diagram of function modules of a controller and a node according to an embodiment of this application.

For example, as shown in FIG. 13, a controller in a communication system may include an obtaining module, a prediction module, an optimization module, and a routing module, and a node may include a monitoring module and a forwarding module.

The monitoring module in the node may be configured to detect whether a link of a connection meets an adjustment condition, and when the link of the connection meets the adjustment condition, report link information (for indicating traffic of the link at a plurality of historical moments) to the obtaining module in the controller.

The obtaining module in the controller may be configured to obtain data such as the node set, topology information of the communication network, and the traffic of the link at the plurality of historical moments. The prediction module in the controller is configured to predict traffic of the link at a plurality of future moments based on the traffic of the link at the plurality of historical moments, and determine whether the link belongs to a to-be-adjusted link based on the traffic at the future moments. The routing module in the controller is configured to calculate a path between the nodes. The optimization module in the controller is configured to obtain a target segment identifier list of a target flow carried on the to-be-adjusted link based on the path between the nodes, the topology information of the communication network, and the node set.

The optimization module in the controller is further configured to send the target segment identifier list of the target flow to a source node of the target flow. The forwarding module in the source node is configured to forward a packet of the target flow based on the received target segment identifier list.

When an integrated unit is used, the communication device that belongs to the controller or the first node and that is provided in this application may include a processing module, a storage module, and a communication module. The processing module may be configured to control and manage an action of the communication device. For example, the processing module may be configured to support the communication device in performing the action performed by the controller or the first node in S101 to S105. The storage module may be configured to support the communication device in storing program code, data, and the like. The communication module may be configured to perform communication between the communication device and another device.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (DSP) and a microprocessor. The storage module may be a memory. The communication module may be a device that interacts with another device, such as a radio frequency circuit, a BLUETOOTH chip, or a WI-FI chip.

In an embodiment, when the processing module is a processor, the storage module is a memory, and the communication module is a communication interface, the communication device in this embodiment may be a communication device having the structure shown in FIG. 2. In an implementation, the foregoing modules and the like included in the communication device may be computer programs stored in a memory, and are invoked by a processor to implement corresponding execution functions of the modules.

Embodiments of this application further provide a communication system. The communication system includes the foregoing controller and a plurality of nodes. The controller is communicatively connected to the plurality of nodes, and the plurality of nodes belong to a same communication network. The controller includes any communication device (the communication device shown in FIG. 11) that belongs to the controller and that is provided in the embodiments of this application, and the node includes any communication device (the communication device shown in FIG. 12) that belongs to the first node and that is provided in the embodiments of this application.

Embodiments of this application provide a computer storage medium. The storage medium stores a computer program. When the computer program is run on a computer, the computer is enabled to perform the method performed by the first node or the second node in any data transmission method provided in the embodiments of this application.

Embodiments of this application further provide a computer program product including instructions. When the computer program product is run on a communication device, the communication device is enabled to perform the method performed by the first node or the second node in any data transmission method provided in the embodiments of this application.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, the procedure, or functions according to embodiments of this application are all or partially generated. The computer may be a general-purpose computer, a computer network, or another programmable apparatus. The computer instruction may be stored in a computer readable storage medium, or transmitted from one computer readable storage medium to another computer readable storage medium. For example, the computer instruction may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, but cannot be understood as an indication or implication of relative importance. The term "at least one" refers to one or more, and the term "a plurality of" refers to two or more, unless expressly limited otherwise. The term "and/or" describes only an association relationship between associated objects and indicates that there may be three relationships. For example, A and/or B may represent the following three cases: only A exists, both A and B exist, and only B exists.

Different types of embodiments such as the method embodiments and the device embodiments provided in the embodiments of this application may be mutually referred to. This is not limited in the embodiments of this application. A sequence of the operations of the method embodiment provided in embodiments of this application can be properly adjusted, and the operations can be correspondingly added or deleted based on a situation. Any method that can be easily figured out by a person skilled in the art within a technical scope disclosed in this application shall fall within the protection scope of this application. Therefore, details are not described again.

In the corresponding embodiments provided in this application, it should be understood that the disclosed system, device, and the like may be implemented in other composition manners. For example, the described device embodiment is merely an example. For example, division into modules is merely logical function division. During actual implementation, there may be another division manner. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electrical or other forms.

The units described as separate parts may or may not be physically separate, and parts described as units may or may not be physical units, may be located in one position, or may be distributed on a plurality of devices. Some or all of the units may be selected based on actual requirements to achieve the objectives of the solutions of embodiments.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

communicatively coupling to nodes in a communication network;

determining a node set from the nodes, wherein the node set includes a node that supports segment routing (SR);

determining a target flow from first flows carried on first links between the nodes, wherein a source node of the target flow belongs to the node set;

obtaining a target segment identifier list of the target flow, wherein the target segment identifier list comprises a first segment identifier of a sink node of the target flow and a second segment identifier of at least one intermediate node, and wherein the at least one intermediate node is of the node set and is located on a first path between the source node and the sink node, and wherein obtaining the target segment identifier list comprises:

determining a to-be-adjusted link set from the first links, wherein second links in the to-be-adjusted link set meet an adjustment condition, and wherein a third link in the to-be-adjusted link set carries at least one target flow;

collecting statistics on the first flows;

obtaining an initial segment identifier list of each of the at least one target flow, wherein each of the initial segment identifier list indicates a current packet forwarding path of each of the at least one target flow;

repeatedly performing an update process, wherein the update process comprises:

randomly selecting a first target flow from the at least one target flow;

determining whether a first candidate segment identifier list exists in the first target flow;

updating, based on the first candidate segment identifier list, the initial segment identifier list of the first target flow to obtain an updated initial segment identifier list of the first target flow when the first candidate segment identifier list exists in the first target flow;

updating, based on a second path indicated by the updated initial segment identifier list, the first flows, wherein the first candidate segment identifier list indicates a third path from a first source node to a first sink node of the first target flow, first congestion probability corresponding to the first candidate segment identifier list is less than a second congestion probability corresponding to the initial segment identifier list, and a third congestion probability corresponding to one segment identifier list is an average value of congestion probabilities of the second links when the first target flow is carried on a fourth path indicated by the one segment identifier list; and stopping repeatedly performing the update process when at least one condition in a stop condition set is met, wherein the stop condition set comprises a fourth congestion probability corresponding to the updated initial segment identifier list is less than or equal to a congestion probability threshold; and setting a second updated initial segment identifier list of each of the at least one target flow as the target segment identifier list of each of the at least one target flow; and sending, to the source node, the target segment identifier list to instruct the source node to forward a packet of the target flow based on the target segment identifier list.

2. The method of claim 1, wherein determining the target flow comprises determining the target flow from second flows carried on the second links.

3. The method of claim 2, wherein the adjustment condition comprises a first congestion rate of a fourth link is greater than a first congestion threshold.

4. The method of claim 2, further comprising receiving, from at least one of the nodes, link information indicating that at least one link coupled to each node meets the adjustment condition, and wherein determining the to-be-adjusted link set comprises determining, based on the link information, the to-be-adjusted link set.

5. The method of claim 4, wherein the link information further indicates first traffic of each of the at least one link at a plurality of historical moments, and wherein determining the to-be-adjusted link set further comprises:

predicting, based on the first traffic, second traffic of each link at a plurality of future moments;

determining, based on the second traffic, the to-be-adjusted link, wherein congestion probabilities of the to-be-adjusted link at, at least $x$ future moments are greater than a congestion probability threshold; and determining, based on the to-be-adjusted link, the to-be-adjusted link set.

6. The method of claim 2, wherein, for some of the at least one target flow, a fourth path indicated by the target segment identifier list is different from a current packet forwarding path of the target flow.

7. The method of claim 6, wherein the stop condition set further comprises that a duration of repeatedly performing the update process has reached a duration threshold.

8. The method of claim 6, wherein the first target flow is carried on the second path, and wherein a fifth congestion probability of a fourth link that is in the first links and that is outside the to-be-adjusted link set is less than or equal to the congestion probability threshold.

9. The method of claim 6, wherein the first candidate segment identifier list is a candidate segment identifier list with a smallest congestion probability in a plurality of candidate segment identifier lists when the candidate segment identifier lists corresponding to the initial segment identifier list of the first target flow exists.

10. The method of claim 2, wherein the adjustment condition is that a fourth link is faulty.

11. The method of claim 2, wherein the adjustment condition is that a first congestion rate of a fourth link is greater than the first congestion threshold and congestion probabilities of the fourth link at $x$ future moments are greater than a congestion probability threshold, and wherein $x \geq 2$.

12. A communication device communicatively coupled to a plurality of nodes and comprising:

a memory configured to store instructions; and a plurality of processors coupled to the memory and configured to execute the instructions to cause the communication device to:

determine a node set from the nodes, wherein the node set comprises a node that supports segment routing (SR);

determine a target flow from first flows carried on first links between the nodes, wherein a source node of the target flow in a communication network belongs to the node set;

obtain a target segment identifier list of the target flow, wherein the target segment identifier list comprises a first segment identifier of a sink node of the target flow in the communication network and a second segment identifier of at least one intermediate node, and wherein the at least one intermediate node is of the node set and is located on a first path between the source node and the sink node, and wherein obtaining the target segment identifier list comprises:

determining a to-be-adjusted link set from the first links, wherein second links in the to-be-adjusted link set meet an adjustment condition, and wherein a third link in the to-be-adjusted link set carries at least one target flow;

collecting statistics on the first flows;

obtaining an initial segment identifier list of each of the at least one target flow, wherein each of the initial segment identifier list indicates a current packet forwarding path of each of the at least one target flow;

repeatedly performing an update process, wherein the update process comprises:

randomly selecting a first target flow from the at least one target flow;

determining whether a first candidate segment identifier list exists in the first target flow;

updating, based on the first candidate segment identifier list, the initial segment identifier list of the first target flow to obtain an updated initial segment identifier list of the first target flow when the first candidate segment identifier list exists in the first target flow;

updating, based on a second path indicated by the updated initial segment identifier list, the first flows, wherein the first candidate segment identifier list indicates a third path from a first source node to a first sink node of the first target flow, first congestion probability corresponding to the first candidate segment identifier list is less than a second congestion probability corresponding to the initial segment identifier list, and a third congestion probability corresponding to one segment identifier list is an average value of congestion probabilities of the second links when the first target flow is carried on a fourth path indicated by the one segment identifier list; and stopping repeatedly performing the update process when at least one condition in a stop condition set is met, wherein the stop condition set comprises a fourth congestion probability corresponding to the updated initial segment identifier list is less than or equal to a congestion probability threshold; and setting a second updated initial segment identifier list of each of the at least one target flow as the target segment identifier list of each of the at least one target flow; and send, to the source node, the target segment identifier list to instruct the source node to forward a packet of the target flow based on the target segment identifier list.

13. The communication device of claim 12, wherein the processors are further configured to execute the instructions to cause the communication device to:

determine third links in the to-be-adjusted link set meet an adjustment condition; and determine the target flow from second flows carried on the third links.

14. The communication device of claim 13, wherein the adjustment condition comprises:

a first congestion rate of a fourth link is greater than a first congestion threshold;

a fifth link is faulty; or a second congestion rate of a sixth link is greater than the first congestion threshold and congestion probabilities of the sixth link at x future moments are greater than a congestion probability threshold, wherein $x \geq 2$.

15. The communication device of claim 13, wherein the processors are further configured to execute the instructions to cause the communication device to:

receive, from at least one of the nodes, link information indicating that at least one link coupled to each node meets the adjustment condition; and determine, based on the link information, the to-be-adjusted link set.

16. The communication device of claim 15, wherein the link information further indicates first traffic of each of the at least one link at a plurality of historical moments, and wherein the processors are further configured to execute the instructions to cause the communication device to:

predict, based on the first traffic, second traffic of each link at a plurality of future moments;

determine, based on the second traffic, the to-be-adjusted link, wherein congestion probabilities of the to-be-adjusted link at, at least x future moments are greater than a congestion probability threshold; and determine, based on the to-be-adjusted link, the to-be-adjusted link set.

17. The communication device of claim 13, wherein, for some of the at least one target flow, a fourth path indicated by the target segment identifier list is different from a current packet forwarding path of the target flow.

18. The communication device of claim 17, wherein the stop condition set further comprises that a duration of repeatedly performing the update process has reached a duration threshold.

19. The communication device of claim 17, wherein the first target flow is carried on the second path, and wherein a fifth congestion probability of a fourth link that is in the first links and that is outside the to-be-adjusted link set is less than or equal to the congestion probability threshold.

20. The communication device of claim 17, wherein a plurality of candidate segment identifier lists corresponding to the initial segment identifier list of the first target flow exist, and wherein the first candidate segment identifier list is a candidate segment identifier list with a smallest congestion probability in the candidate segment identifier lists.

* * * * *